(12) United States Patent
Zhuo et al.

(10) Patent No.: US 12,375,904 B2
(45) Date of Patent: Jul. 29, 2025

(54) METHOD AND APPARATUS FOR WIRELESS COMMUNICATION

(71) Applicant: Lenovo (Beijing) Limited, Beijing (CN)

(72) Inventors: Yibin Zhuo, Beijing (CN); Mingzeng Dai, Shanghai (CN); Lianhai Wu, Beijing (CN); Le Yan, Shanghai (CN); Congchi Zhang, Shanghai (CN)

(73) Assignee: Lenovo (Beijing) Limited, Beijing (CN)

( * ) Notice: Subject to any disclaimer, the term of this patent is extended or adjusted under 35 U.S.C. 154(b) by 186 days.

(21) Appl. No.: 18/284,975

(22) PCT Filed: Mar. 31, 2021

(86) PCT No.: PCT/CN2021/084504
§ 371 (c)(1),
(2) Date: Sep. 29, 2023

(87) PCT Pub. No.: WO2022/205112
PCT Pub. Date: Oct. 6, 2022

(65) Prior Publication Data
US 2024/0187847 A1 Jun. 6, 2024

(51) Int. Cl.
*H04L 29/06* (2006.01)
*H04W 12/033* (2021.01)
(52) U.S. Cl.
CPC ................. *H04W 12/033* (2021.01)
(58) Field of Classification Search
None
See application file for complete search history.

(56) References Cited

U.S. PATENT DOCUMENTS 11,265,759 B2 * 3/2022 Kim .................. H04W 28/06
11,412,550 B2 * 8/2022 Jeon .................. H04L 1/1642
(Continued)

FOREIGN PATENT DOCUMENTS

CN 110365609 A 10/2019
CN 112567796 B 3/2021
(Continued)

OTHER PUBLICATIONS

Stynes, David et al. Using opportunistic caching to improve the efficiency of handover in LTE with a PON access network backhaul. 2014 IEEE 20th International Workshop on Local & Metropolitan Area Networks (LANMAN). https://ieeexplore.ieee.org/stamp/stamp.jsp?tp=&arnumber=7028621 (Year: 2014).*
(Continued)

*Primary Examiner* — Jeremiah L Avery
(74) *Attorney, Agent, or Firm* — FIG. 1 Patents

(57) ABSTRACT

Embodiments of the present disclosure relate to wireless communication in an IAB network. According to some embodiments of the disclosure, a method may include: ciphering an uplink (UL) packet with a cipher configuration associated with a destination of the UL packet, wherein the UE is connected to a first integrated access and backhaul (IAB) donor and a second IAB donor via an IAB node, and the destination of the UL packet is either the first IAB donor or the second IAB donor; providing the ciphered UL packet with the destination of the UL packet; and transmitting the ciphered UL packet to the destination of the UL packet via the IAB node. By employing the solutions in the present disclosure, a UE can determine that the DL packet is from which IAB donor and thus can process the DL packet accordingly. Moreover, an IAB node can determine that the UL packet is to which IAB donor and can route the UL packet to the corresponding IAB donor.

20 Claims, 11 Drawing Sheets

(56) References Cited

U.S. PATENT DOCUMENTS

| | | | |
|---|---|---|---|
| 2019/0357238 A1* | 11/2019 | Zhou | H04W 72/23 |
| 2019/0357262 A1* | 11/2019 | Cirik | H04W 76/27 |
| 2020/0045745 A1* | 2/2020 | Cirik | H04W 74/0833 |
| 2020/0084618 A1* | 3/2020 | Teyeb | H04W 80/02 |
| 2020/0252847 A1* | 8/2020 | Park | H04W 76/27 |
| 2020/0259601 A1* | 8/2020 | Zhou | H04L 5/0085 |
| 2020/0314732 A1* | 10/2020 | Park | H04L 5/0055 |
| 2020/0359440 A1* | 11/2020 | Qiao | H04W 76/11 |
| 2021/0051512 A1* | 2/2021 | Hampel | H04W 40/22 |
| 2021/0099898 A1* | 4/2021 | You | H04W 24/08 |
| 2021/0160728 A1* | 5/2021 | Jung | H04L 5/0064 |
| 2021/0168645 A1* | 6/2021 | Adjakple | H04W 72/54 |
| 2021/0195675 A1* | 6/2021 | Park | H04W 88/14 |

FOREIGN PATENT DOCUMENTS

| | | | |
|---|---|---|---|
| WO | 2019216717 A1 | 11/2019 | |
| WO | 2019246446 A1 | 12/2019 | |
| WO | 2020000203 A1 | 1/2020 | |
| WO | 2020006734 A1 | 1/2020 | |

OTHER PUBLICATIONS

Metin, Taner et al. Integration of Optical Wireless Communication with 5G Systems. 2020 IEEE Globecom Workshops. https://ieeexplore.ieee.org/stamp/stamp.jsp?tp=&arnumber=9367502 (Year: 2020).*

Wei, Hung-Yu et al. Wireless Relay Networking Using IEEE 802.16 WiMAX Technologies, pp. 122-220. https://ieeexplore.ieee.org/xpl/ebooks/bookPdfWithBanner.jsp?fileName=8042413.pdf&bkn=8039571&pdfType=chapter (Year: 2013).*

PCT/2021/084504 , "International Seach Report and Written Opinion", PCT Application No. PCT/2021/084504, Dec. 30, 2021, 7 pages.

* cited by examiner

METHOD AND APPARATUS FOR WIRELESS COMMUNICATION

TECHNICAL FIELD

Embodiments of the present disclosure generally relate to wireless communication technology, and more particularly to wireless communication in an integrated access and backhaul (IAB) network.

BACKGROUND

Wireless communication systems are widely deployed to provide various telecommunication services, such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems, such as long term evolution (LTE) systems, LTE-advanced (LTE-A) systems, or LTE-A Pro systems, and fifth generation (5G) systems which may also be referred to as new radio (NR) systems.

To extend the coverage and availability of wireless communication systems (e.g., 5G systems), the 3rd generation partnership project (3GPP) is envisioning an integrated access and backhaul (IAB) architecture for supporting multi-hop relays. In an IAB network, an IAB node may hop through one or more IAB nodes before reaching a base station (also referred to as "an IAB donor" or "a donor node"). A single hop may be considered a special instance of multiple hops. Multi-hop backhauling is beneficial because it provides a relatively greater coverage extension compared to single-hop backhauling. In a relatively high frequency radio communication system (e.g., radio signals transmitted in frequency bands over 6 GHz), relatively narrow or less signal coverage may benefit from multi-hop backhauling techniques.

The industry desires technologies for handling wireless communications in the IAB network.

SUMMARY

Some embodiments of the present disclosure provide a method performed by a user equipment (UE). The method may include: ciphering an uplink (UL) packet with a cipher configuration associated with a destination of the UL packet, wherein the UE is connected to a first integrated access and backhaul (IAB) donor and a second IAB donor via an IAB node, and the destination of the UL packet is either the first IAB donor or the second IAB donor; providing the ciphered UL packet with the destination of the UL packet; and transmitting the ciphered UL packet to the destination of the UL packet via the IAB node.

In some embodiments of the present disclosure, providing the ciphered UL packet with the destination of the UL packet may include adding an indication of whether the destination of the UL packet is the first IAB donor or the second IAB donor to the ciphered UL packet. The indication may be added to a radio link control (RLC) header or a medium access control (MAC) sub-header for the ciphered UL packet. In some examples, the indication may be an identifier of the first or second IAB donor, an identifier of a centralized unit (CU) of the first or second IAB donor, or an identifier of a control plane (CP) of the CU of the first or second IAB donor. In some examples, the indication may include at least one bit to indicate the first or second IAB donor.

In some embodiments of the present disclosure, providing the ciphered UL packet with the destination of the UL packet may include mapping the ciphered UL packet to a data radio bearer (DRB) associated with the destination of the UL packet. In some examples, the method may further include receiving a first association between the first IAB donor and a first set of data radio bearers (DRBs), a second association between the second IAB donor and a second set of DRBs, or both from the first IAB donor. In some examples, the method may further include receiving the first association, the second association, or both from the second IAB donor. In the case that the destination of the UL packet is the first IAB donor, the DRB associated with the destination of the UL packet is from the first set of DRBs; and in the case that the destination of the UL packet is the second IAB donor, the DRB associated with the destination of the UL packet is from the second set of DRBs.

In some embodiments of the present disclosure, providing the ciphered UL packet with the destination of the UL packet may include mapping the ciphered UL packet to a logical channel (LCH) or a radio link control (RLC) channel associated with the destination of the UL packet. The method may further include receiving a first association between the first IAB donor and a first set of logical channel IDs (LCIDs), a second association between the second IAB donor and a second set of LCIDs, or both from the first IAB donor; and receiving the first association, the second association, or both from the second IAB donor. In the case that the destination of the UL packet is the first IAB donor, an LCID for the LCH or RLC channel associated with the destination of the UL packet is included in the first set of LCIDs; and in the case that the destination of the UL packet is the second IAB donor, the LCID for the LCH or RLC channel associated with the destination of the UL packet is included in the second set of LCIDs.

Some embodiments of the present disclosure provide a method performed by an integrated access and backhaul (IAB) node. The method may include: receiving an uplink (UL) packet from a user equipment (UE), wherein the UE is connected to a first IAB donor and a second IAB donor via the IAB node; determining a destination of the UL packet from the received UL packet, wherein the destination of the UL packet is either the first IAB donor or the second IAB donor; and transmitting the UL packet to the destination of the UL packet.

In some embodiments of the present disclosure, determining the destination of the UL packet may include determining the destination of the UL packet based on an indication of whether the destination of the UL packet is the first IAB donor or the second IAB donor in the UL packet. The indication may be included in a radio link control (RLC) header or a medium access control (MAC) sub-header for the UL packet. In some examples, the indication may be an identifier of the first or second IAB donor, an identifier of a centralized unit (CU) of the first or second IAB donor, or an identifier of a control plane (CP) of the CU of the first or second IAB donor. In some examples, the indication may include at least one bit to indicate the first or second IAB donor.

In some embodiments of the present disclosure, determining the destination of the UL packet may include determining the destination of the UL packet based on a data radio bearer (DRB) where the UL packet is received and at least one of a first association and a second association.

In some examples, the first association may indicate a mapping between the first IAB donor and a first set of DRBs, and the second association may indicate a mapping between the second IAB donor and a second set of DRBs. In the case that the DRB where the UL packet is received is from the first set of DRBs, the destination of the UL packet is the first IAB donor; and in the case that the DRB where the UL packet is received is from the second set of DRBs, the destination of the UL packet is the second IAB donor.

In some examples, the first association may indicate a mapping between a first set of backhaul adaptation protocol (BAP) routing IDs associated with the first IAB donor and a first set of DRBs, and the second association may indicate a mapping between a second set of BAP routing IDs associated with the second IAB donor and a second set of DRBs. In the case that the DRB where the UL packet is received is from the first set of DRBs, transmitting the UL packet to the destination of the UL packet may include transmitting the UL packet according to one of the first set of BAP routing IDs; and in the case that the DRB where the UL packet is received is from the second set of DRBs, transmitting the UL packet to the destination of the UL packet may include transmitting the UL packet according to one of the second set of BAP routing IDs.

In some examples, the first association may indicate a mapping between a first parent node of the IAB node and a first set of DRBs, the second association may indicate a mapping between a second parent node of the IAB node and a second set of DRBs. In the case that the DRB where the UL packet is received is from the first set of DRBs, transmitting the UL packet to the destination of the UL packet may include transmitting the UL packet to the first parent node; and in the case that the DRB where the UL packet is received is from the second set of DRBs, transmitting the UL packet to the destination of the UL packet may include transmitting the UL packet to the second parent node.

In some embodiments of the present disclosure, determining the destination of the UL packet may include determining the destination of the UL packet based on a logical channel (LCH) or a radio link control (RLC) channel where the UL packet is received and at least one of a first association and a second association.

In some examples, the first association may indicate a mapping between the first IAB donor and a first set of logical channel IDs (LCIDs), and the second association may indicate a mapping between the second IAB donor and a second set of LCIDs. In the case that an LCID for the LCH or RLC channel where the UL packet is received is included in the first set of LCIDs, the destination of the UL packet is the first IAB donor; and in the case that the LCID for the LCH or RLC channel where the UL packet is received is included in the second set of LCIDs, the destination of the UL packet is the second IAB donor.

In some examples, the first association may indicate a mapping between a first set of backhaul adaptation protocol (BAP) routing IDs associated with the first IAB donor and a first set of logical channel IDs (LCIDs), and the second association may indicate a mapping between a second set of BAP routing IDs associated with the second IAB donor and a second set of LCIDs. In the case that an LCID for the LCH or RLC channel where the UL packet is received is included in the first set of LCIDs, transmitting the UL packet to the destination of the UL packet may include transmitting the UL packet according one of the first set of BAP routing IDs; and in the case that the LCID for the LCH or RLC channel where the UL packet is received is included in the second set of LCIDs, transmitting the UL packet to the destination of the UL packet may include transmitting the UL packet according to one of the second set of BAP routing IDs.

In some examples, the first association may indicate a mapping between a first parent node of the IAB node and a first set of logical channel IDs (LCIDs), and the second association may indicate a mapping between a second parent node of the IAB node and a second set of LCIDs. In the case that an LCID for the LCH or RLC channel where the UL packet is received is included in the first set of LCIDs, transmitting the UL packet to the destination of the UL packet may include transmitting the UL packet to the first parent node; and in the case that the LCID for the LCH or RLC channel where the UL packet is received is included in the second set of LCIDs, transmitting the UL packet to the destination of the UL packet may include transmitting the UL packet to the second parent node.

In some embodiments of the present disclosure, the method may further include receiving, from at least one of the first IAB donor and the second IAB donor, an association between a data radio bearer (DRB) from at least one of the first IAB donor and the second IAB donor and one or more logical channel IDs (LCIDs).

In some embodiments of the present disclosure, the method may further include receiving the first association, the second association, or both from the first IAB donor. In some embodiments of the present disclosure, the method may further include receiving the first association, the second association, or both from the second IAB donor. In some embodiments of the present disclosure, the method may further include determining the first association, the second association, or both; and transmitting the first association, the second association, or both to at least one of the first IAB donor and the second IAB donor.

In some embodiments of the present disclosure, determining the destination of the UL packet may include determining the destination of the UL packet based on an identifier of a cell where the UL packet is received, wherein the cell is configured in a distributed unit (DU) of the IAB node associated with the first IAB donor or second IAB donor.

Some embodiments of the present disclosure provide a method performed by an integrated access and backhaul (IAB) node. The method may include: receiving a downlink (DL) packet for transmission to a user equipment (UE), wherein the UE is connected to a first integrated access and backhaul (IAB) donor and a second IAB donor via the IAB node; determining a source of the DL packet, wherein the source of the DL packet is either the first IAB donor or the second IAB donor; providing the DL packet with the source of the DL packet; and transmitting the DL packet to the UE.

In some embodiments of the present disclosure, providing the DL packet with the source of the DL packet may include adding an indication of whether the source of the DL packet is the first IAB donor or the second IAB donor to the DL packet. The indication may be added to a radio link control (RLC) header or a medium access control (MAC) subheader for the DL packet. In some examples, the indication may be an identifier of the first or second IAB donor, an identifier of a centralized unit (CU) of the first or second IAB donor, or an identifier of a control plane (CP) of the CU of the first or second IAB donor. In some examples, the indication may include at least one bit to indicate the first or second IAB donor.

In some embodiments of the present disclosure, providing the DL packet with the source of the DL packet may include mapping the DL packet to a data radio bearer (DRB) associated with the source of the DL packet. In some examples, the method may further include: determining a first association between the first IAB donor and a first set of data radio bearers (DRBs), a second association between the second IAB donor and a second set of DRBs, or both; and transmitting the first association, the second association, or both to at least one of the first IAB donor and the second IAB donor. In some examples, the method may further include: receiving a first association between the first IAB donor and a first set of data radio bearers (DRBs), a second association between the second IAB donor and a second set of DRBs, or both from the first IAB donor. In some examples, the method may further include: receiving the first association, the second association, or both from the second IAB donor. In the case that the source of the DL packet is the first IAB donor, the DRB associated with the source of the DL packet is from the first set of DRBs; and in the case that the source of the DL packet is the second IAB donor, the DRB associated with the source of the DL packet is from the second set of DRBs.

In some embodiments of the present disclosure, providing the DL packet with the source of the DL packet may include mapping the DL packet to a logical channel (LCH) or a radio link control (RLC) channel associated with the source of the DL packet. In some examples, the method may further include: determining a first association between the first IAB donor and a first set of logical channel IDs (LCIDs), a second association between the second IAB donor and a second set of LCIDs, or both; and transmitting the first association, the second association, or both to at least one of the first IAB donor and the second IAB donor. In some examples, the method may further include: receiving a first association between the first IAB donor and a first set of logical channel IDs (LCIDs), a second association between the second IAB donor and a second set of LCIDs, or both from the first IAB donor. In some examples, the method may further include: receiving the first association, the second association, or both from the second IAB donor. In the case that the source of the DL packet is the first IAB donor, an LCID for the LCH or the RLC channel associated with the source of the DL packet is included in the first set of LCIDs; and in the case that the source of the DL packet is the second IAB donor, an LCID for the LCH or the RLC channel associated with the source of the DL packet is included in the second set of LCIDs.

In some embodiments of the present disclosure, the method may further include: receiving, from at least one of the first IAB donor and the second IAB donor, an association between a data radio bearer (DRB) from at least one of the first IAB donor and one or more logical channel IDs (LCIDs).

Some embodiments of the present disclosure provide a method performed by a user equipment (UE). The method may include: receiving a downlink (DL) packet from an integrated access and backhaul (IAB) node, wherein the UE is connected to a first IAB donor and a second IAB donor via the IAB node; determining a source of the DL packet based on the received DL packet, wherein the source of the DL packet is either the first IAB donor or the second IAB donor; and deciphering the DL packet with a decipher configuration associated with the source of the DL packet.

In some embodiments of the present disclosure, determining the source of the DL packet may include: determining the source of the DL packet based on an indication of whether the source of the DL packet is the first IAB donor or the second IAB donor in the DL packet. The indication may be included in a radio link control (RLC) header or a medium access control (MAC) sub-header for the DL packet. In some examples, the indication may be an identifier of the first or second IAB donor, an identifier of a centralized unit (CU) of the first or second IAB donor, or an identifier of a control plane (CP) of the CU of the first or second IAB donor. In some examples, the indication may include at least one bit to indicate the first or second IAB donor.

In some embodiments of the present disclosure, the method may further include receiving a first association between the first IAB donor and a first set of data radio bearers (DRBs), a second association between the second IAB donor and a second set of DRBs, or both from the first IAB donor. In some embodiments of the present disclosure, the method may further include receiving the first association, the second association, or both from the second IAB donor. Determining the source of the DL packet may include: determining the source of the DL packet based on a DRB where the DL packet is received and at least one of the first association and second association. In the case that the DRB where the DL packet is received is from the first set of DRBs, the source of the DL packet is the first IAB donor; and in the case that the DRB where the DL packet is received is from the second set of DRBs, the source of the DL packet is the second IAB donor.

In some embodiments of the present disclosure, the method may further include receiving a first association between the first IAB donor and a first set of logical channel IDs (LCIDs), a second association between the second IAB donor and a second set of LCIDs, or both from the first IAB donor; and receiving the first association, the second association, or both from the second IAB donor. Determining the source of the DL packet may include: determining the source of the DL packet based on a logical channel (LCH) or a radio link control (RLC) channel where the DL packet is received and at least one of the first association and second association. In the case that an LCID for the LCH or the RLC channel where the DL packet is received is included in the first set of LCIDs, the source of the DL packet is the first IAB donor; and in the case that the LCID for the LCH or the RLC channel where the DL packet is received is included in the second set of LCIDs, the source of the DL packet is the second IAB donor.

In some embodiments of the present disclosure, determining the source of the DL packet may include: determining the source of the DL packet based on an identifier of a cell where the DL packet is received, wherein the cell is configured in a distributed unit (DU) of the IAB node associated with the first IAB donor or second IAB donor.

Some embodiments of the present disclosure provide a method performed by an integrated access and backhaul (IAB) donor. The method may include: constructing a first association between the IAB donor and a first set of data radio bearers (DRBs) or logical channel IDs (LCIDs) of a user equipment (UE), wherein the UE is connected to the IAB donor and another IAB donor via an IAB node; and transmitting, to at least one of the UE, the IAB node and the another IAB donor, the constructed first association.

In some embodiments of the present disclosure, the method may further include transmitting, to at least one of the UE, the IAB node and the another IAB donor, a second association between the another IAB donor and a second set of data radio bearers (DRBs) or logical channel IDs (LCIDs) of the UE. In some embodiments of the present disclosure, the method may further include receiving, from the IAB node or the another IAB donor, the second association.

In some embodiments of the present disclosure, the method may further include transmitting, to the IAB node, a mapping between a set of backhaul adaptation protocol (BAP) routing IDs associated with the IAB donor and the first set of DRBs. In some embodiments of the present disclosure, the method may further include transmitting, to the IAB node, between a parent node of the IAB node and the first set of DRBs.

In some embodiments of the present disclosure, the method may further include transmitting, to the IAB node, a mapping between a set of backhaul adaptation protocol (BAP) routing IDs associated with the IAB donor and the first set of LCIDs. In some embodiments of the present disclosure, the method may further include transmitting, to the IAB node, a mapping between the set of BAP routing IDs associated with the IAB donor and the first set of LCIDs.

In some embodiments of the present disclosure, the method may further include transmitting, to the IAB node, an association between a DRB from the IAB donor and one or more LCIDs.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

Some embodiments of the present disclosure provide a user equipment (UE). The UE may include a processor and a transceiver coupled to the processor. The processor may be configured to: cipher an uplink (UL) packet with a cipher configuration associated with a destination of the UL packet, wherein the UE is connected to a first integrated access and backhaul (IAB) donor and a second IAB donor via an IAB node, and the destination of the UL packet is either the first IAB donor or the second IAB donor; and provide the ciphered UL packet with the destination of the UL packet. The transceiver may be configured to transmit the ciphered UL packet to the destination of the UL packet via the IAB node.

In some embodiments of the present disclosure, to provide the ciphered UL packet with the destination of the UL packet, the processor may be further configured to add an indication of whether the destination of the UL packet is the first IAB donor or the second IAB donor to the ciphered UL packet. The indication may be added to a radio link control (RLC) header or a medium access control (MAC) sub-header for the ciphered UL packet. In some examples, the indication may be an identifier of the first or second IAB donor, an identifier of a centralized unit (CU) of the first or second IAB donor, or an identifier of a control plane (CP) of the CU of the first or second IAB donor. In some examples, the indication may include at least one bit to indicate the first or second IAB donor.

In some embodiments of the present disclosure, to provide the ciphered UL packet with the destination of the UL packet, the processor may be further configured to map the ciphered UL packet to a data radio bearer (DRB) associated with the destination of the UL packet. In some examples, the transceiver may be further configured to receive a first association between the first IAB donor and a first set of data radio bearers (DRBs), a second association between the second IAB donor and a second set of DRBs, or both from the first IAB donor. In some examples, the transceiver may be further configured to receive the first association, the second association, or both from the second IAB donor. In the case that the destination of the UL packet is the first IAB donor, the DRB associated with the destination of the UL packet is from the first set of DRBs; and in the case that the destination of the UL packet is the second IAB donor, the DRB associated with the destination of the UL packet is from the second set of DRBs.

In some embodiments of the present disclosure, to provide the ciphered UL packet with the destination of the UL packet, the processor may be further configured to map the ciphered UL packet to a logical channel (LCH) or a radio link control (RLC) channel associated with the destination of the UL packet. The transceiver may be further configured to: receive a first association between the first IAB donor and a first set of logical channel IDs (LCIDs), a second association between the second IAB donor and a second set of LCIDs, or both from the first IAB donor; and receive the first association, the second association, or both from the second IAB donor. In the case that the destination of the UL packet is the first IAB donor, an LCID for the LCH or RLC channel associated with the destination of the UL packet is included in the first set of LCIDs; and in the case that the destination of the UL packet is the second IAB donor, the LCID for the LCH or RLC channel associated with the destination of the UL packet is included in the second set of LCIDs.

Some embodiments of the present disclosure provide an integrated access and backhaul (IAB) node. The IAB node may include a processor and a transceiver coupled to the processor. The transceiver may be configured to receive a downlink (DL) packet for transmission to a user equipment (UE), and wherein the UE is connected to a first integrated access and backhaul (IAB) donor and a second IAB donor via the IAB node. The processor may be configured to determine a source of the DL packet, wherein the source of the DL packet is either the first IAB donor or the second IAB donor; and provide the DL packet with the source of the DL packet. The transceiver may be further configured to transmit the DL packet to the UE.

In some embodiments of the present disclosure, to provide the DL packet with the source of the DL packet, the processor may be further configured to add an indication of whether the source of the DL packet is the first IAB donor or the second IAB donor to the DL packet. The indication may be added to a radio link control (RLC) header or a medium access control (MAC) sub-header for the DL packet. In some examples, the indication may be an identifier of the first or second IAB donor, an identifier of a centralized unit (CU) of the first or second IAB donor, or an identifier of a control plane (CP) of the CU of the first or second IAB donor. In some examples, the indication may include at least one bit to indicate the first or second IAB donor.

In some embodiments of the present disclosure, to provide the DL packet with the source of the DL packet, the processor may be further configured to map the DL packet to a data radio bearer (DRB) associated with the source of the DL packet. In some examples, the processor may be further configured to determine a first association between the first IAB donor and a first set of data radio bearers (DRBs), a second association between the second IAB donor and a second set of DRBs, or both. The transceiver may be further configured to transmit the first association, the second association, or both to at least one of the first IAB donor and the second IAB donor. In some examples, the transceiver may be further configured to receive a first association between the first IAB donor and a first set of data radio bearers (DRBs), a second association between the second IAB donor and a second set of DRBs, or both from the first IAB donor. In some examples, the transceiver may be further configured to receive the first association, the second association, or both from the second IAB donor. In the case that the source of the DL packet is the first IAB donor, the DRB associated with the source of the DL packet is from the first set of DRBs; and in the case that the source of the DL packet is the second IAB donor, the DRB associated with the source of the DL packet is from the second set of DRBs.

In some embodiments of the present disclosure, to provide the DL packet with the source of the DL packet, the processor may be further configured to map the DL packet to a logical channel (LCH) or a radio link control (RLC) channel associated with the source of the DL packet. In some examples, the processor may be further configured to determine a first association between the first IAB donor and a first set of logical channel IDs (LCIDs), a second association between the second IAB donor and a second set of LCIDs, or both; and the transceiver may be further configured to transmit the first association, the second association, or both to at least one of the first IAB donor and the second IAB donor. In some examples, the transceiver may be further configured to receive a first association between the first IAB donor and a first set of logical channel IDs (LCIDs), a second association between the second IAB donor and a second set of LCIDs, or both from the first IAB donor. In some examples, the transceiver may be further configured to receive the first association, the second association, or both from the second IAB donor. In the case that the source of the DL packet is the first IAB donor, an LCID for the LCH or the RLC channel associated with the source of the DL packet is included in the first set of LCIDs; and in the case that the source of the DL packet is the second IAB donor, an LCID for the LCH or the RLC channel associated with the source of the DL packet is included in the second set of LCIDs.

In some embodiments of the present disclosure, the transceiver may be further configured to: receive, from at least one of the first IAB donor and the second IAB donor, an association between a data radio bearer (DRB) from at least one of the first IAB donor and one or more logical channel IDs (LCIDs).

Some embodiments of the present disclosure provide an integrated access and backhaul (IAB) donor. The IAB donor may include a processor and a transceiver coupled to the processor. The processor may be configured to construct a first association between the IAB donor and a first set of data radio bearers (DRBs) or logical channel IDs (LCIDs) of a user equipment (UE), wherein the UE is connected to the IAB donor and another IAB donor via an IAB node. The transceiver coupled to the processor, wherein the transceiver may be configured to transmit, to at least one of the UE, the IAB node and the another IAB donor, the constructed first association.

In some embodiments of the present disclosure, the transceiver may be further configured to: transmit, to at least one of the UE, the IAB node and the another IAB donor, a second association between a second set of data radio bearers (DRBs) or logical channel IDs (LCIDs) from the UE and the another IAB donor. In some embodiments of the present disclosure, the transceiver may be further configured to: receive, from the IAB node or the another IAB donor, the second association.

In some embodiments of the present disclosure, the transceiver may be further configured to: transmit, to the IAB node, a mapping between a set of backhaul adaptation protocol (BAP) routing IDs associated with the IAB donor and the first set of DRBs. In some embodiments of the present disclosure, the transceiver may be further configured to: transmit, to the IAB node, between a parent node of the IAB node and the first set of DRBs.

In some embodiments of the present disclosure, the transceiver may be further configured to: transmit, to the IAB node, a mapping between a set of backhaul adaptation protocol (BAP) routing IDs associated with the IAB donor and the first set of LCIDs. In some embodiments of the present disclosure, the transceiver may be further configured to: transmit, to the IAB node, a mapping between the set of BAP routing IDs associated with the IAB donor and the first set of LCIDs.

In some embodiments of the present disclosure, the transceiver may be further configured to: transmit, to the IAB node, an association between a DRB from the IAB donor and one or more LCIDs.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

Figure 1:
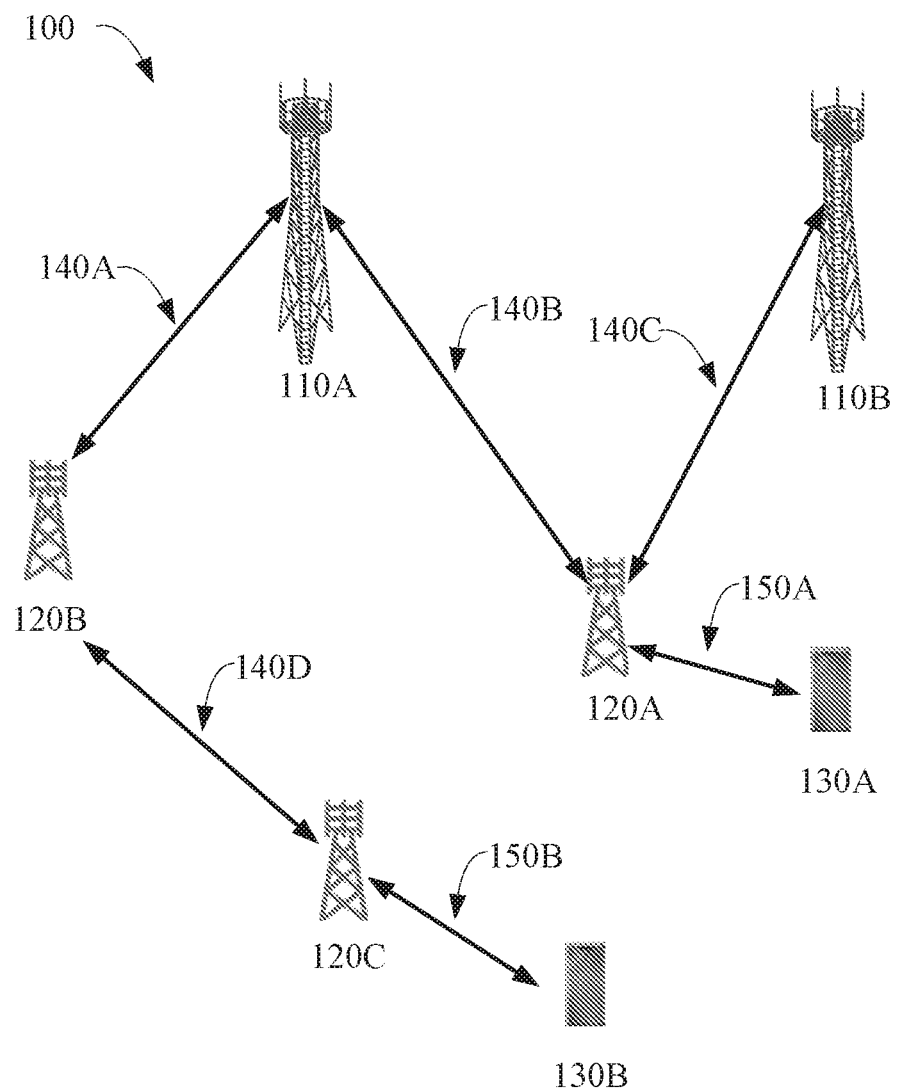
FIG. 1 illustrates a schematic diagram of a wireless communication system in accordance with some embodiments of the present disclosure.

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Compared with the 4G communication system, the 5G communication system has raised more stringent requirements for various network performance indicators, for example, 1000-times capacity increase, wider coverage requirements, ultra-high reliability and ultra-low latency, etc. Considering the rich frequency resources of high-frequency carriers, the use of high-frequency small station deployments is becoming more and more popular in hotspot areas, in order to meet the needs of 5G ultra-high capacity. However, high-frequency carriers have poor propagation characteristics, severe attenuation due to obstructions, and limited coverage. Therefore, the dense deployment of small stations is required. On the other hand, the deployment of optical fiber is difficult and costly for these small stations. Therefore, an economical and convenient backhaul scheme is needed. Integrated Access and Backhaul (IAB) technology, whose access link and backhaul link both use wireless transmission solutions to avoid fiber deployment, provides ideas for solving the above problems.

In an IAB network, a relay node (RN) or IAB node or a wireless backhaul node/device can provide wireless access services for UEs. That is, a UE can connect to an IAB donor relayed by one or more IAB nodes. And the IAB donor may also be called a donor node or a donor base station (e.g., DgNB, Donor gNodeB). In addition, the wireless link between an IAB donor and an IAB node, or the wireless link between different IAB nodes can be referred to as "backhaul link."

An IAB node may include an IAB mobile terminal (MT) part and an IAB distributed unit (DU) part. When an IAB node connects to its parent node (which may be another IAB node or an IAB donor), it can be regarded as a UE, i.e., the role of the MT. When an IAB node provides service to its child node (which may be another IAB node or a UE), it can be regarded as a network device, i.e., the role of the DU.

An IAB donor can be an access network element with a complete base station function, or an access network element with a separate form of a centralized unit (CU) and a distributed unit (DU). The IAB donor may be connected to the core network (for example, connected to the 5G core network (5GC)), and provide the wireless backhaul function for the IAB nodes. The CU of an IAB donor may be referred to as "IAB donor-CU" (or directly referred to as "CU"), and the DU of the IAB donor may be referred to as "IAB donor-DU." The IAB donor-CU may be separated into a control plane (CP) and a user plane (UP). For example, a CU may include one CU-CP and one or more CU-UPs.

Considering the small coverage of the high frequency band, in order to ensure the coverage performance of the network, multi-hop networking may be adopted in an IAB network. Taking into account the requirements of service transmission reliability, IAB nodes can support dual connectivity (DC) or multi-connectivity to improve the reliability of transmission, so as to deal with abnormal situations that may occur on the backhaul (BH) link, such as radio link failure (RLF) or blockage, load fluctuations, etc.

In the case where an IAB network supports multi-hop and dual-connection networking, there may be multiple transmission paths between the UE and the IAB donor. A transmission path may include multiple nodes, such as a UE, one or more IAB nodes, and an IAB donor (if the IAB donor is in the form of separate CU and DU, it may also contain an IAB donor-DU and IAB donor-CU). Each IAB node may treat the neighboring node that provides backhaul services for it as a parent node (or parent IAB node), and each IAB node can be regarded as a child node (or child IAB node) of its parent node.

FIG. 1 illustrates a schematic diagram of a wireless communication system 100 in accordance with some embodiments of the present disclosure.

As shown in FIG. 1, the wireless communication system 100 may include some base stations (e.g., IAB donor 110A and IAB donor 110B), some IAB nodes (e.g., IAB node 120A, IAB node 120B, and IAB node 120C), and some UEs (e.g., UE 130A and UE 130B). Although a specific number of UEs, IAB nodes, and IAB donors are depicted in FIG. 1, it is contemplated that any number of UEs, IAB nodes, and IAB donors may be included in the wireless communication system 100.

Each of IAB donor 110A, IAB donor 110B, IAB node 120A, IAB node 120B, and IAB node 120C may be directly connected to one or more IAB node(s) in accordance with some other embodiments of the present disclosure. Each of IAB donor 110A, IAB donor 110B, IAB node 120A, IAB node 120B, and IAB node 120C may be directly connected to one or more UEs in accordance with some other embodiments of the present disclosure.

UE 130A and UE 130B may be any type of device configured to operate and/or communicate in a wireless environment. For example, UE 130A and UE 130B may include a computing device, such as a desktop computer, a laptop computer, a personal digital assistant (PDA), a tablet computer, a smart television (e.g., television connected to the Internet), a set-top box, a game console, a security system (including a security camera), a vehicle on-board computer, a network device (e.g., router, switch, and modem), or the like. According to some embodiments of the present disclosure, UE 130A and UE 130B may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, UE 130A and UE 130B may include wearable devices, such as smart watches, fitness bands, optical head-mounted displays, internet-of-things (IOT) devices, or the like. Moreover, UE 130A and UE 130B may be referred to as a subscriber unit, a mobile, a mobile station, a user, a terminal, a mobile terminal, a wireless terminal, a fixed terminal, a subscriber station, a user terminal, or a device, or described using other terminology used in the art.

IAB donors 110A and 110B may be in communication with a core network (not shown in FIG. 1). The core network (CN) may include a plurality of core network components, such as a mobility management entity (MME) (not shown in FIG. 1) or an access and mobility management function (AMF) (not shown in FIG. 1). The CNs may serve as gateways for the UEs to access a public switched telephone network (PSTN) and/or other networks (not shown in FIG. 1).

Wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with 5G NR of the 3GPP protocol. For example, IAB donors 110A and 110B may transmit data using an orthogonal frequency division multiple (OFDM) modulation scheme on the DL. UE 130A and UE 130B may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

Persons skilled in the art should understand that as technology develops and advances, the terminologies described in the present disclosure may change, but should not affect or limit the principles and spirit of the present disclosure.

Referring to FIG. 1, IAB node 120A can be directly connected to IAB donors 110A and 110B, and IAB node 120B can be directly connected to IAB donor 110A. IAB donors 110A and 110B are parent nodes of IAB node 120A, and IAB donor 110A is a parent node of IAB node 120B. In other words, IAB nodes 120A and 120B are child IAB nodes of IAB donor 110A, and IAB node 120A is also a child IAB node of IAB donor 110B. IAB node 120C can reach IAB donor 110A by hopping through IAB node 120B. IAB node 120B is a parent IAB node of IAB node 120C. In other words, IAB node 120C is a child IAB node of IAB node 120B.

UEs 130A and 130B can be connected to IAB nodes 120A and 120C, respectively. Uplink (UL) packets (e.g., data or signaling) from UE 130A or UE 130B can be transmitted to an IAB donor (e.g., IAB donor 110A or 110B) via one or more IAB nodes, and then transmitted by the IAB donor to a mobile gateway device (such as the user plane function (UPF) in the 5GC). Downlink (DL) packets (e.g., data or signaling) can be transmitted from the IAB donor (e.g., IAB donor 110A or 110B) after being received by the gateway device, and then transmitted to UE 130A or 130B through one or more IAB nodes.

For example, referring to FIG. 1, UE 130A may transmit UL data to IAB donor 110A or 110B or receive DL data therefrom via IAB node 120A. UE 130B may transmit UL data to IAB donor 110A or receive DL data therefrom via IAB node 120C and IAB node 120B.

In an IAB deployment such as the wireless communication system 100, the radio link between an IAB donor (e.g., IAB donor 110A or 110B in FIG. 1) and an IAB node or between two IAB nodes may be referred to as a backhaul link (BL). The radio link between an IAB donor (e.g., IAB donor 110A or 110B in FIG. 1) and a UE or between an IAB node and a UE may be referred to as an access link (AL). For example, in FIG. 1, radio links 140A to 140D are BLs and radio links 150A and 150B are ALs.

A protocol layer, the backhaul adaptation protocol (BAP) layer, located above the radio link control (RLC) layer is introduced in an IAB system, and can be used to realize packet routing, bearer mapping and flow control on the wireless backhaul link.

An F1 interface may be established between an IAB node (e.g., the DU part of the IAB node) and an IAB donor (e.g., IAB donor-CU). The F1 interface may support both a user plane protocol (e.g., F1-U) and a control plane protocol (e.g., F1-C). The user plane protocol of the F1 interface may include one or more of general packet radio service (GPRS) tunneling protocol user plane (GTP-U), user datagram protocol (UDP), internet protocol (IP) and other protocols. The control plane protocol of the F1 interface may include one or more of F1 application protocol (F1AP), stream control transport protocol (SCTP), IP, and other protocols.

Through the control plane of the F1 interface, an IAB node and an IAB donor can perform, for example, interface management, IAB-DU management, and UE context-related configuration. Through the user plane of the F1 interface, an IAB node and an IAB donor can perform, for example, user plane data transmission and downlink transmission status feedback functions.

Figure 2:
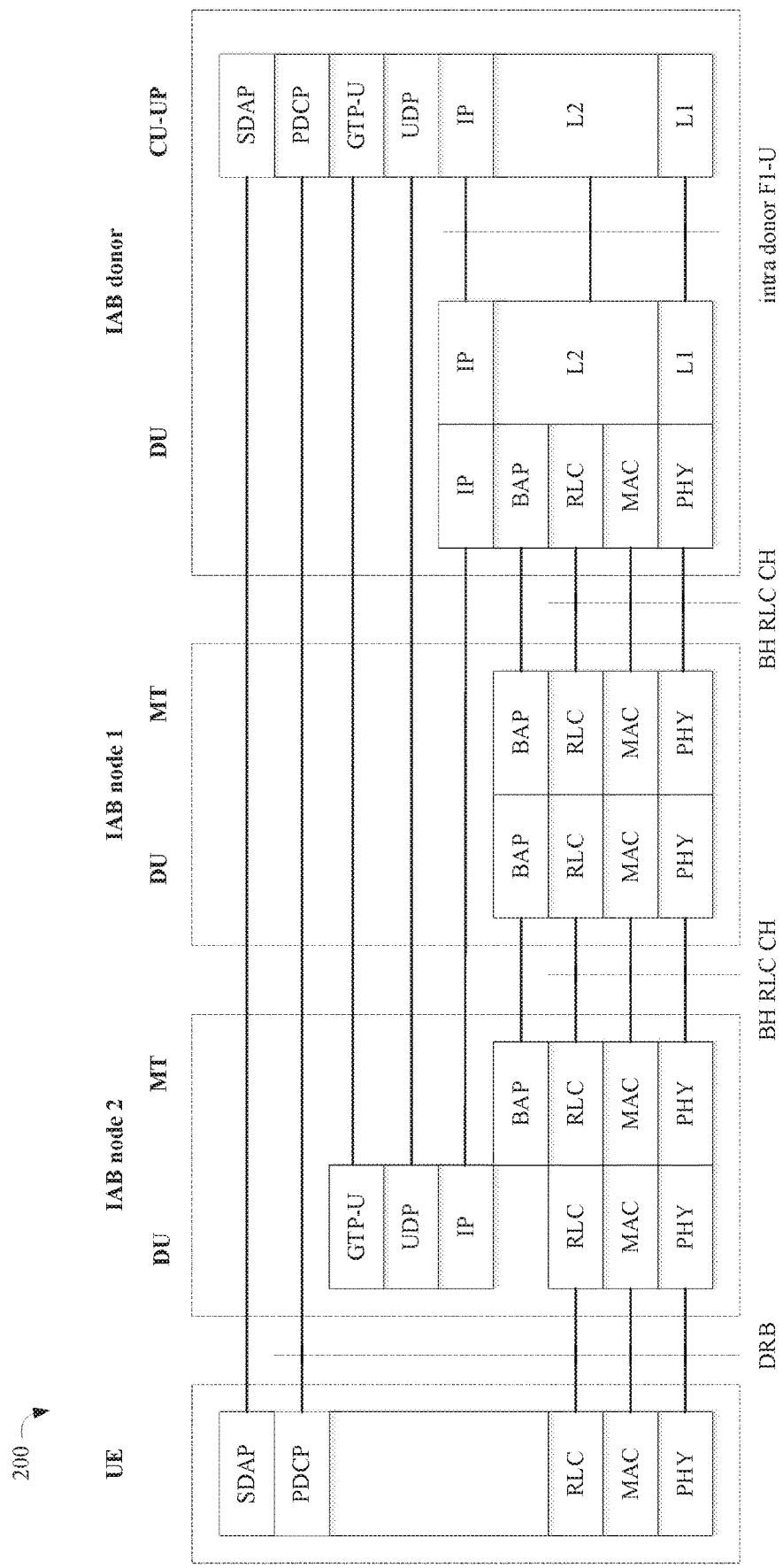
FIG. 2 illustrates an example block diagram of a protocol stack for an IAB network in accordance with some embodiments of the present disclosure.
Figure 3:
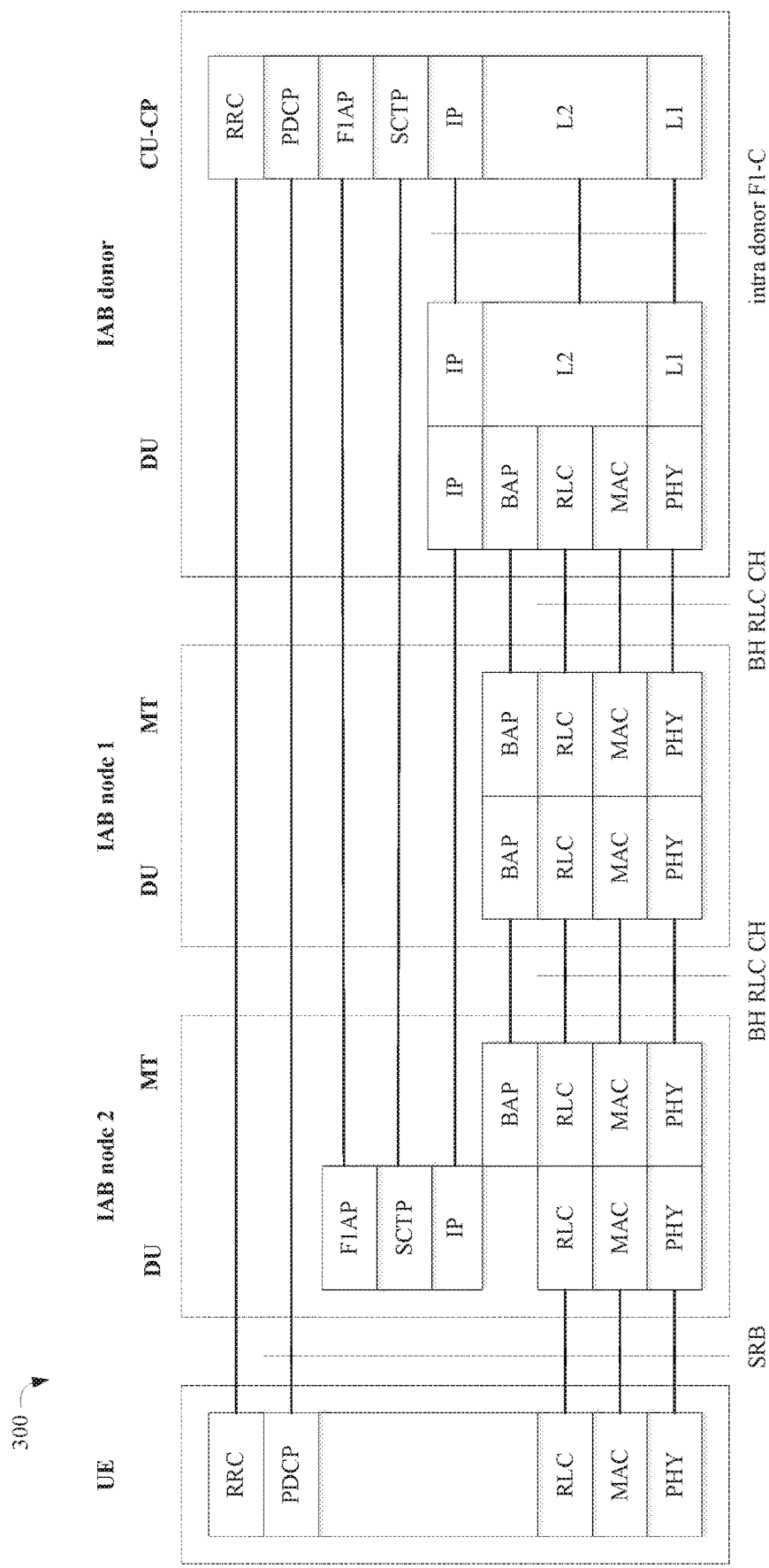
FIG. 3 illustrates an example block diagram of a protocol stack for an IAB network in accordance with some embodiments of the present disclosure.

FIG. 2 illustrates an example block diagram of a user plane (UP) protocol stack 200 for an IAB network according to some embodiments of the present disclosure. FIG. 3 illustrates an example block diagram of a control plane (CP) protocol stack 300 for an IAB network according to some embodiments of the present disclosure. In FIGS. 2 and 3, a UE may be connected to an IAB donor via IAB node 2 and IAB node 1.

Referring to FIG. 2, the UP protocol stack of the UE may include a service data adaptation protocol (SDAP) layer, a packet data convergence protocol (PDCP) layer, a radio link control (RLC) layer, a medium access control (MAC) layer, and a physical (PHY) layer. The UP protocol stack of the DU of IAB node 2 may include a GTP-U layer, a UDP layer, an IP layer, an RLC layer, a MAC layer, and a PHY layer. The UP protocol stack of the MT of IAB node 2 or the DU or MT of IAB node 1 may include a BAP layer, an RLC layer, a MAC layer, and a PHY layer. The UP protocol stack of the DU of the IAB donor may include an IP layer, a BAP layer, an RLC layer, a MAC layer, and a PHY layer, where the PHY layer belongs to layer 1 (L1), and the BAP layer, the RLC layer, the MAC layer belongs to layer 2 (L2). The protocol stack of the CU-UP of the IAB donor may include a GTP-U layer, a UDP layer, an IP layer, a SDAP layer, a PDCP layer, a L2 layer(s), and a L1 layer.

Referring to FIG. 3, the CP protocol stack of the UE may include a radio resource control (RRC) layer, a PDCP layer, an RLC layer, a MAC) layer, and a physical (PHY) layer. The CP protocol stack of the DU of IAB node 2 may include an F1AP layer, an SCTP layer, an IP layer, an RLC layer, a MAC layer, and a PHY layer. The CP protocol stack of the MT of IAB node 2 or the DU or MT of IAB node 1 may include a BAP layer, an RLC layer, a MAC layer, and a PHY layer. The CP protocol stack of the DU of the IAB donor may include an IP layer, a BAP layer, an RLC layer, a MAC layer, and a PHY layer, where the PHY layer belongs to L1, and the BAP layer, the RLC layer, and the MAC layer belongs to L2. The protocol stack of the CU-CP of the IAB donor may include an RRC layer, a PDCP layer, an F1AP layer, an SCTP layer, an IP layer, a L2 layer(s), and a L1 layer.

The protocol stacks shown in FIGS. 2 and 3 are only for illustrative purpose. For example, the sequences of some of the protocol layers in the protocol stacks of FIGS. 2 and 3 may be rearranged for illustrative purpose. For example, although the SDAP and PDCP layers belong to L2, they are shown above the GTP-U layer, the UDP layer and the IP layer in the protocol stack of the CU-UP of the IAB donor in FIG. 2.

In the case of a dual active protocol stack (DAPS) handover, a UE may continue the downlink user data reception from a source BS until releasing the source cell and continues the uplink user data transmission to the source BS until successful random access procedure to a target BS. This means that the UE may transmit to or receive from the two BSs simultaneously. In order to realize the dual transmission links, the UE may establish two active protocols, which may include respective RLC, MAC, and PHY layers associated with the corresponding BSs, and a common PDCP layer for both BSs. The PDCP layer or entity may be configured with two sets of security functions and keys and each set is associated with a corresponding BS.

Figure 4:
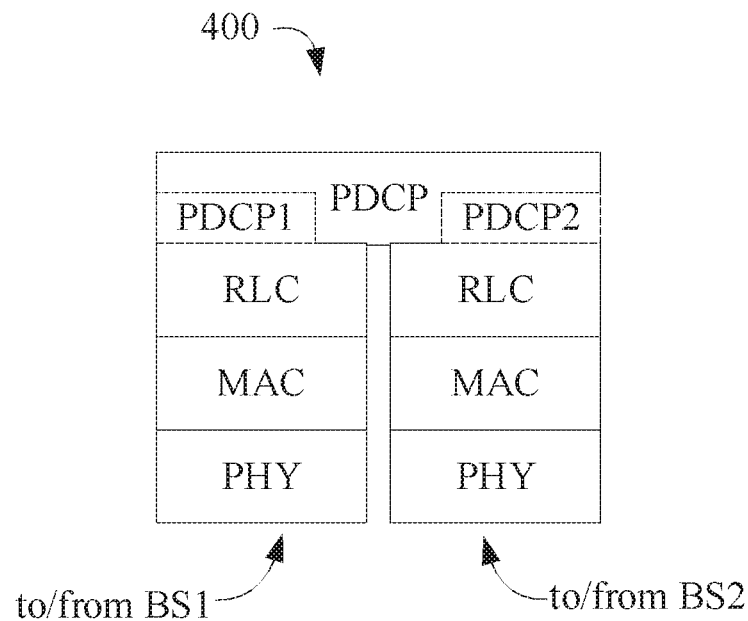
FIG. 4 illustrates an example block diagram of a protocol stack for a UE in accordance with some embodiments of the present disclosure.

FIG. 4 illustrates an example block diagram of a protocol stack 400 of a UE for DAPS according to some embodiments of the present disclosure. Referring to FIG. 4, the UE may include two active protocol stacks associated with respective BSs (e.g., BS 1 and BS 2), respectively. The two active protocol stacks may share a PDCP layer, which may be configured with two sets of security functions and keys (e.g., PDCP 1 and PDCP 2 in dotted blocks) for BS 1 and BS 2, respectively.

For DAPS bearers, the PDCP entity may perform the ciphering of the PDCP service data unit (SDU) using the ciphering configurations (e.g., ciphering algorithm and key) or deciphering of the PDCP protocol data unit (PDU) using the deciphering configurations (e.g., deciphering algorithm and key) configured for the source cell or the target cell, based on, respectively, to or from which cell the PDCP SDU is transmitted or received. Persons skilled in the art would comprehend that in some cases, deciphering configurations may be generally referred to as ciphering configurations.

For the UL, the UE can transmit the UL packets, which are ciphered with the configuration from a cell, to the corresponding RLC, MAC, and PHY layers and then to the cell. For the DL, based on the received packets from a cell, the UE can use the corresponding deciphering configuration configured by the cell to decipher the DL packets.

As shown in FIGS. 2 and 3, in an IAB network, a PDCP layer may be located at the IAB donor side and UE side. For the IAB DAPS, similar to the UE DAPS described with respect to FIG. 4, an IAB node may establish dual active protocols associated with both parent nodes, respectively. However, since the PDCP layer is terminated in a UE, the DAPS protocol for the IAB node is different from that for the UE.

Figure 5:
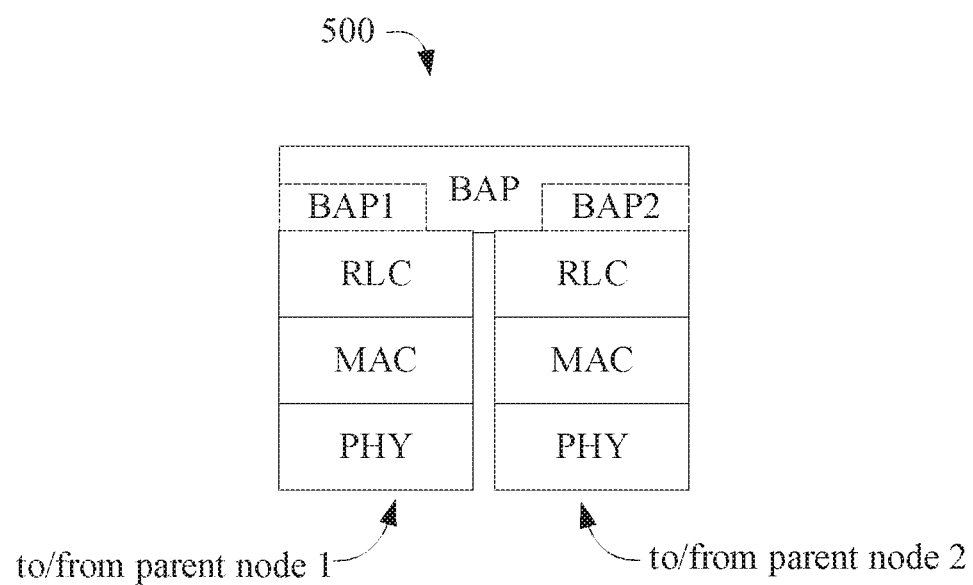
FIG. 5 illustrates an example block diagram of a protocol stack for an IAB node in accordance with some embodiments of the present disclosure.

For example, FIG. 5 illustrates an example block diagram of a protocol stack 500 of an IAB node for DAPS according to some embodiments of the present disclosure. Referring to FIG. 5, the IAB node may include two sets of RLC, MAC, and PHY layers associated with respective parent nodes (e.g., parent nodes 1 and 2), and a common BAP layer (e.g., BAP in a solid block) or separate BAP layers (e.g., BAP 1 and BAP 2 in dotted blocks).

As mentioned above, for DAPS bearers, the PDCP entity in a UE may be configured with two sets of security functions and keys, each of which may be associated with a corresponding BS (e.g., IAB donor in the case of an IAB network). For example, FIG. 6 illustrates an example block diagram of a protocol stack for an IAB network supporting the DAPS according to some embodiments of the present disclosure.

Figure 6:
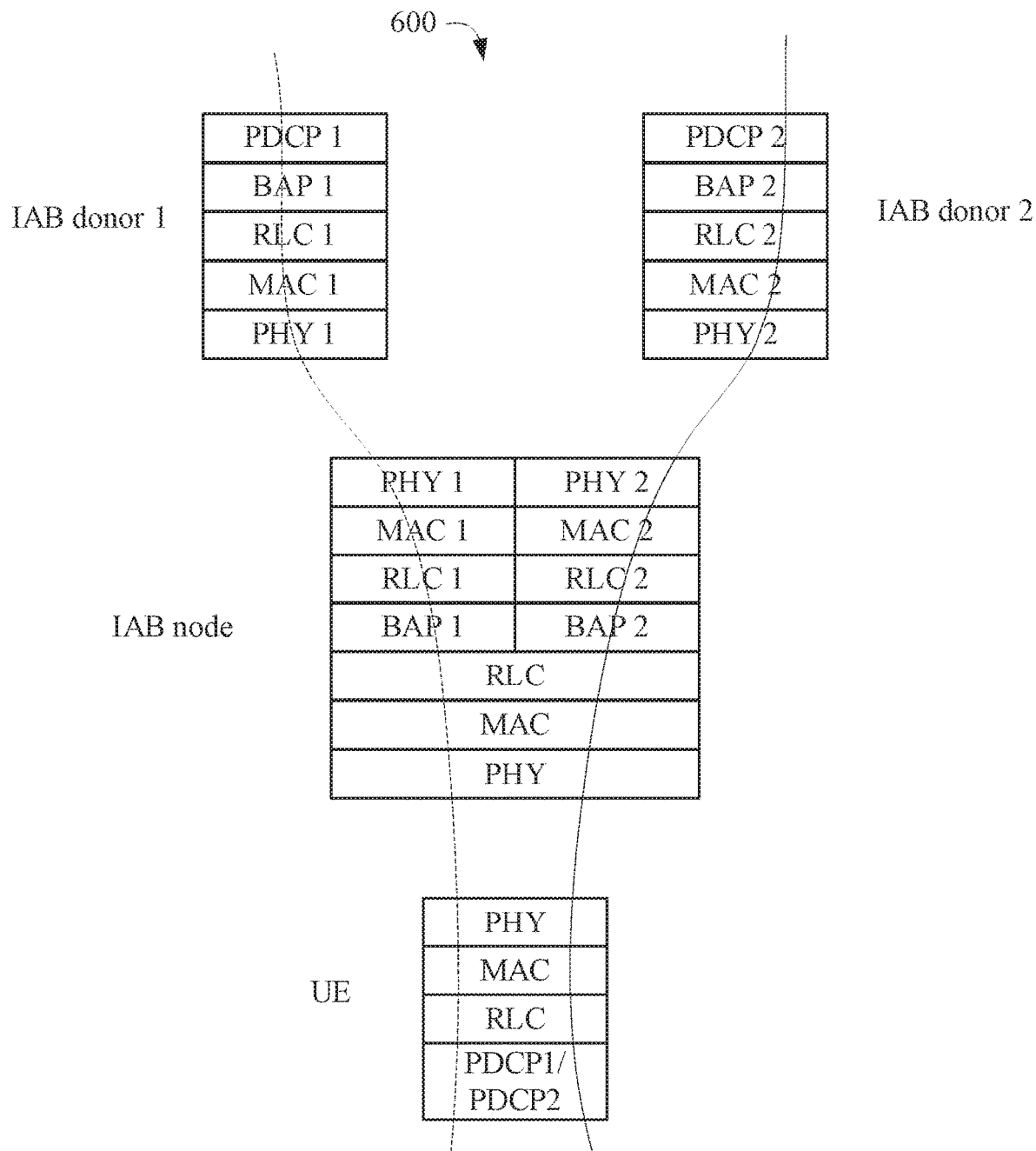
FIG. 6 illustrates an example block diagram of a protocol stack for an IAB network in accordance with some embodiments of the present disclosure.

In FIG. 6, an IAB node may be connected to two IAB donors (e.g., IAB donor 1 or IAB donor 2) and a UE may be connected to the two IAB donors via the IAB node. Although the IAB node is directly connected to IAB donor 1 or IAB donor 2 in FIG. 6, it is contemplated that the IAB node may be connected to IAB donor 1 or IAB donor 2 via one or more other IAB nodes in accordance with some other embodiments of the present disclosure. Although in FIG. 6, IAB node includes separate BAP layers (e.g., BAP 1 and BAP 2), it is contemplated that the IAB node may be a common BAP layer in accordance with some other embodiments of the present disclosure.

Referring to FIG. 6, DL packets may be ciphered in the PDCP entity, for example, PDCP 1 of IAB donor 1 or PDCP 2 of IAB donor 2, and then transmitted to the UE via the IAB node. In response to the reception of the packets by the UE, the PDCP entity of the UE may use the corresponding deciphering configuration, for example, PDCP 1 configured by IAB donor 1 or PDCP 2 configured by IAB donor 2, to decipher the DL packets. The UE may cipher UL packets to IAB donor 1 or IAB donor 2 using the corresponding ciphering configuration (e.g., PDCP 1 configured by IAB donor 1 or PDCP 2 configured by IAB donor 2), and may transmit the ciphered UL packets to the IAB donor 1 or IAB donor 2 via the IAB node.

However, in order to support a DAPS for an IAB node, for DL transmission, an issue that needs to be solved is how a UE identifies (e.g., UE 130A in FIG. 1 and the UE in FIG. 6) which ciphering configuration (e.g., a set of security function and key) is used for the DL packet and forwards the DL packet to the appropriate security function, for example, for deciphering. Moreover, for UL transmission, the access IAB node (e.g., IAB node 120A in FIG. 1 and IAB node in FIG. 6) needs to realize the routing function in order to route the UL packet to the appropriate IAB donor associated with the used ciphering configuration. An issue that needs to be solved is how the access IAB makes the routing decision for each packet.

Embodiments of the present disclosure provide solutions to enhance the routing function, which can solve the above issues. More details on the embodiments of the present disclosure will be illustrated in the following text in combination with the appended drawings.

Figure 7:
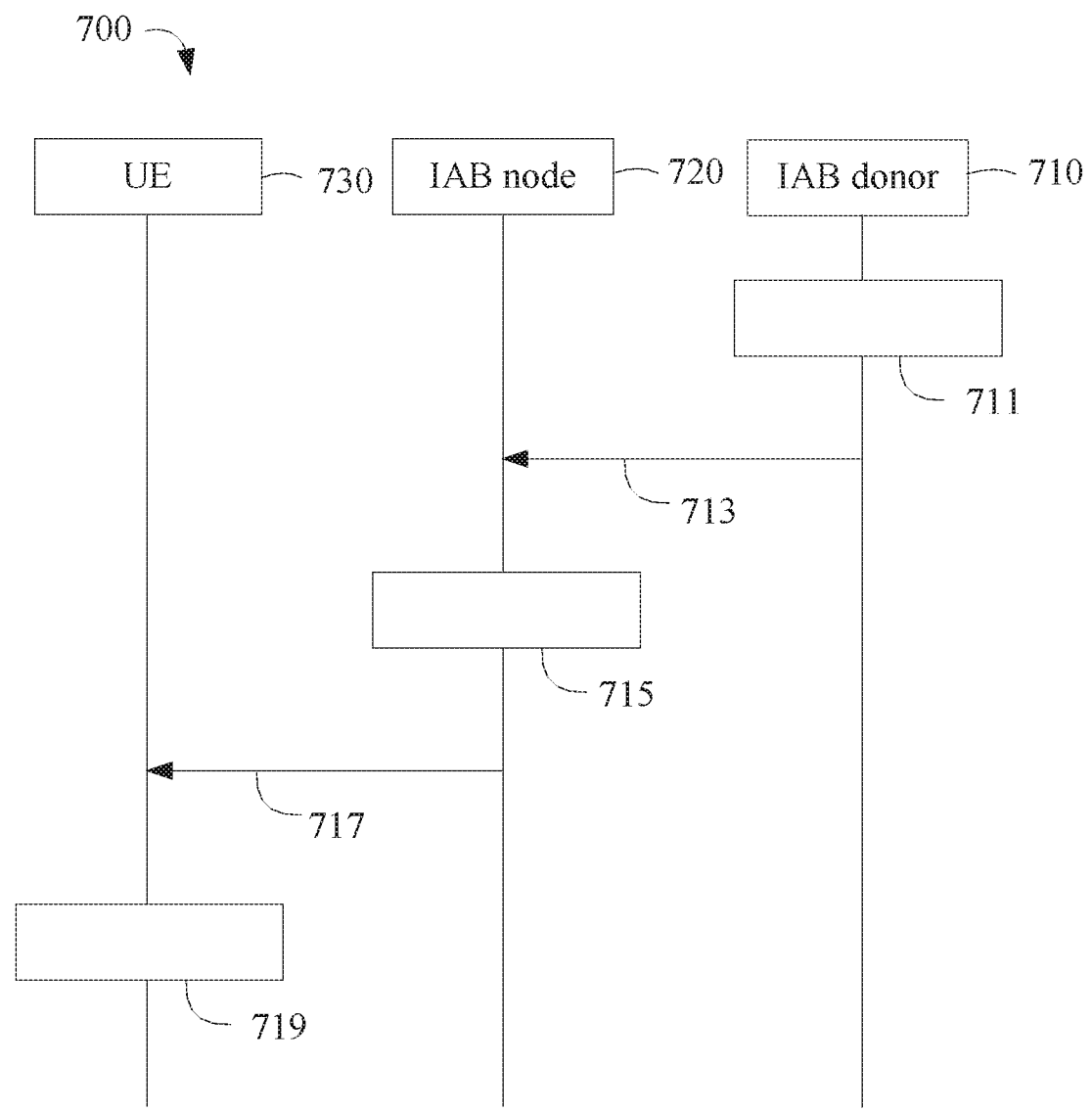
FIG. 7 illustrates a flow chart of an exemplary procedure of wireless communications in accordance with some embodiments of the present disclosure.

FIG. 7 illustrates a flow chart of an exemplary procedure 700 of wireless communications in accordance with some embodiments of the present disclosure.

Details described in all of the foregoing embodiments of the present disclosure are applicable for the embodiments shown in FIG. 7. It should be appreciated by persons skilled in the art that the sequence of the operations in exemplary procedure 700 may be changed and some of the operations in exemplary procedure 700 may be eliminated or modified, without departing from the spirit and scope of the disclosure.

In some examples, UE 730 may function as UE 130A or UE 130B in FIG. 1, or the UEs in FIGS. 2-4 and 6. IAB node 720 may function as IAB node 120A, IAB node 120B or IAB node 120C in FIG. 1, IAB node 1 or IAB node 2 in FIGS. 2 and 3, or the IAB node in FIGS. 5 and 6. The IAB donor 710 may function as IAB donor 110A or IAB donor 110B in FIG. 1, the IAB donor in FIGS. 2 and 3, BS 1 or BS 2 in FIG. 4, or IAB donor 1 or IAB donor 2 in FIG. 6.

The exemplary procedure 700 shows a procedure of a downlink transmission, in which UE 730 is connected to IAB donor 710 and another IAB donor (not shown in FIG. 7) via IAB node 720.

Referring to FIG. 7, in operation 711, IAB donor 710 may cipher a DL packet to UE 730. In operation 713, the ciphered packet may be transmitted to IAB node 720 for transmitting to UE 730. For example, the DL packet may be a PDCP SDU. The ciphered packet may be a PDCP PDU or a PDCP PDU with other header(s) added by the RLC layer, the MAC layer, or both.

For example, a CU of IAB donor 710 may cipher the DL packet at, for example, its PDCP layer, with a corresponding cipher configuration (e.g., ciphering algorithm and key). The ciphered packet may be delivered to a DU of IAB donor 710 through, for example, a wired or wireless transmission. Then, the DU of IAB donor 710 may transmit the ciphered packet to IAB node 720 based on the routing and bearer mapping rules configured by the CU of IAB donor 710. In some embodiments, there may be one or more IAB nodes between IAB donor 710 and IAB node 720. In some embodiments, IAB node 720 may be directly connected to IAB donor 710. IAB node 720 may be the serving node of UE 730 which terminates the DL packets.

In operation 715, in response to receiving the DL packet to UE 730, IAB node 720 may determine a source of the DL packet. For example, IAB node 720 can determine that the DL packets are transmitted from which IAB donor or IAB donor-CU based on an IP address in the F1-U interface or an IP header for the DL packet. In other words, the IP addresses of the DL packets from different IAB donors or IAB donor-CUs are different.

Various solutions are proposed to facilitate the identification of the ciphering configuration of the DL packet by the UE.

For example, in some embodiments of the present disclosure, IAB node 720 may have more than one logical IAB-DU. Each of the more than one IAB-DU may be associated with a corresponding IAB donor. In this way, different IAB-DUs can split DL packets from different IAB donors.

Figure 8A:
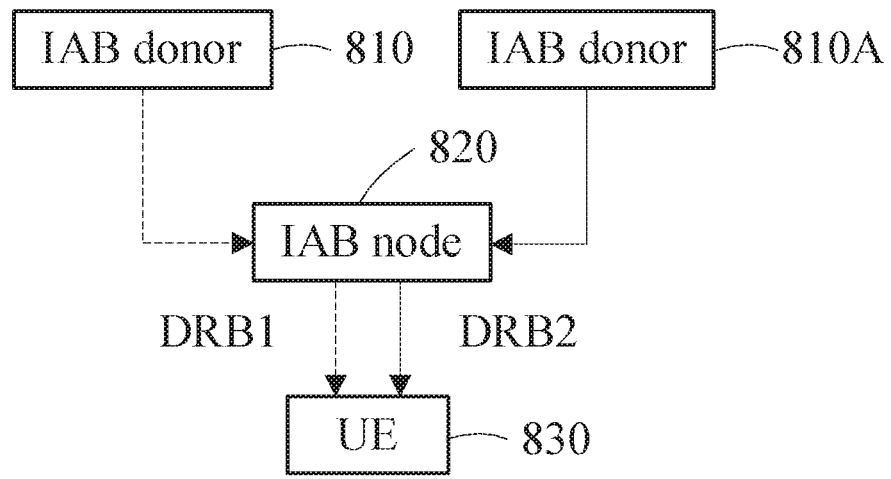
FIGS. 8A-8C illustrate schematic diagrams of wireless communication systems in accordance with some embodiments of the present disclosure.
Figure 8B:
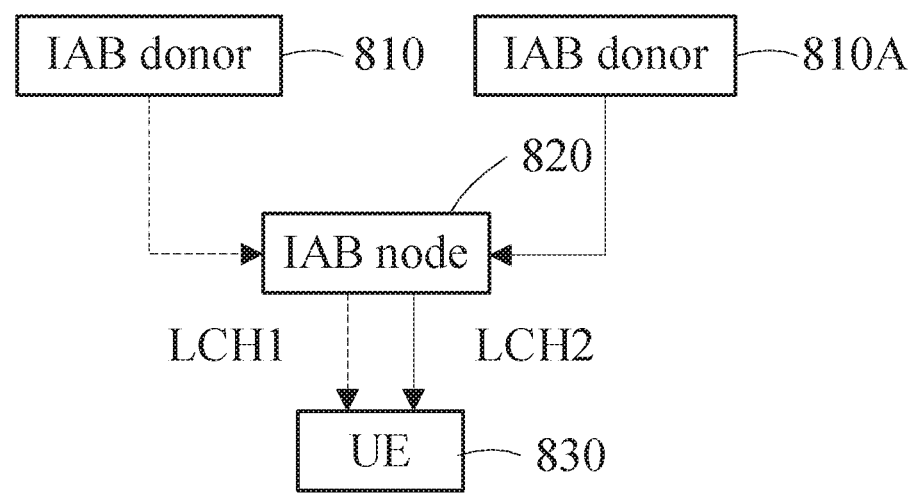
Figure 8C:
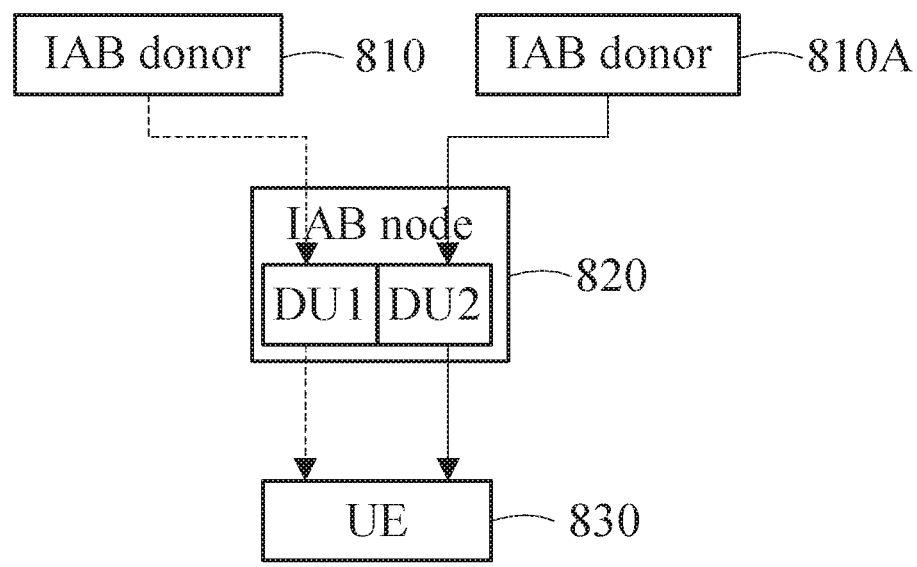

For example, referring to FIG. 8C, UE 830 may be connected to two IAB donors (e.g., IAB donor 810 and IAB donor 810A) via IAB node 820. IAB node 820 may include two DUs, DU 1 and DU 2, wherein DU 1 is associated with IAB donor 810 and DU 2 is associated with IAB donor 810A. For example, separate F1 interfaces may be established between the two DUs and the respective IAB donors. In this way, IAB node 820 would know the relationship between the DUs of IAB node 820 and IAB donors 810 and 810A. UE 830 can determine which DU (e.g., DU 1 or DU 2) of IAB node 820 the DL packet is from based on, for example, an identifier that can identify the DU of IAB node 820.

For example, the MT of IAB node 820 would deliver the packets from IAB donor 810 to DU 1, which would transmit the packets to UE 830. The data delivering within IAB node 820 may belong to the implementation of IAB node 820. UE 830 may receive the DL packet from a cell, which is configured in DU 1 of IAB node 820 associated with IAB donor 810. UE 830 can determine that the DL packet is from DU 1 of IAB node 820 based on, for example, the identifier (e.g., cell global identifier (CGI)) of the cell, or any other identifiers which can identify DU 1 of IAB node 820.

Similarly, the MT of IAB node 820 would deliver the packets from IAB donor 810A to DU 2, which would transmit the packets to UE 830. UE 830 may receive the DL packet from a cell, which is configured in DU 2 of IAB node 820 associated with IAB donor 810A. UE 830 can determine that the DL packet is from DU 2 of IAB node 820 based on, for example, the identifier (e.g., cell global identifier (CGI)) of the cell, or any other identifiers which can identify DU 2 of IAB node 820.

Referring back to FIG. 7, in some other embodiments of the present disclosure, before transmitting the DL packet to UE 730, IAB node 720 may provide the DL packet with the source of the DL packet (e.g., IAB donor 710). In this way, UE 730 can identify which IAB donor or IAB donor-CU the DL packet is from.

In operation 717, IAB node 720 may transmit the DL packet with the source of the DL packet to UE 730. In operation 719, in response to the reception of the DL packet, UE 730 may determine a source of the DL packet (e.g., IAB donor 710) based on the received DL packet. UE 730 may decipher the DL packet with a decipher configuration (e.g., deciphering algorithm and key) associated with the source of the DL packet.

In some embodiments of the present disclosure, IAB node 720 may add an indication of whether the source of the DL packet is IAB donor 710 or the another IAB donor (not shown in FIG. 7) to the DL packet. In this way, IAB node 720 provides the DL packet with the source of the DL packet. Based on the indication in the DL packet, the UE can determine the source of the DL packet.

In some examples, the indication may be an identifier of IAB donor 710 or the another IAB donor, an identifier of a CU of IAB donor 710 or the another IAB donor, or an identifier of a CP of the CU of IAB donor 710 or the another IAB donor. In some examples, the indication may include at least one bit (e.g., 1 bit) to indicate IAB donor 710 or the another IAB donor. For instance, the value of the bit being "0" may indicate the source of the DL packet is IAB donor 710 and the value of the bit being "1" may indicate the source of the DL packet is the another IAB donor (not shown in FIG. 7); or vice versa. In some examples, the indication may be added to an RLC header or a MAC sub-header for the DL packet.

In some embodiments of the present disclosure, IAB node 720 may map the DL packet to a DRB associated with the source of the DL packet. That is, packets from different IAB donors or IAB donor-CUs may be mapped to different DRBs. In this way, IAB node 720 provides the DL packet with the source of the DL packet.

For example, referring to FIG. 8A, UE 830 may be connected to two IAB donors (e.g., IAB donor 810 and IAB donor 810A) via IAB node 820. IAB node 820 may map a DL packet from IAB donor 810 to a DRB (e.g., DRB 1) between IAB node 820 and UE 830, and map a DL packet from IAB donor 810A to another DRB (e.g., DRB 2) between IAB node 820 and UE 830.

To achieve this, an association (hereinafter, "DRB association #1") between IAB donor 810 and a set of DRBs or DRB IDs and an association (hereinafter, "DRB association #2") between IAB donor 810A and another set of DRBs or DRB IDs need to be determined. For example, in the case that the DL packet is from IAB donor 810, IAB node 820 may map the DL packet to a DRB from DRB association #1. In the case that the DL packet is from IAB donor 810A, IAB node 820 may map the DL packet to a DRB from DRB association #2.

DRB association #1, DRB association #2, or both may be determined by IAB node 820, IAB donor 810, IAB donor 810A, or any combination thereof.

In some examples, DRB association #1, DRB association #2, or both may be determined by IAB node 820. In response to the determination, IAB node 820 may transmit the determined DRB association #1, the determined DRB association #2, or both to at least one of IAB donor 810 and IAB donor 810A. For instance, IAB node 820 may determine DRB association #1, and may transmit the determined DRB association #1 to IAB donor 810, IAB donor 810A, or both. IAB node 820, IAB donor 810 or IAB donor 810A may configure the determined DRB association #1, the determined DRB association #2, or both to UE 830. In some examples, IAB node 820 may transmit or configure the determined DRB association #1 and the determined DRB association #2 in a single signaling.

In some examples, DRB association #1, DRB association #2, or both may be determined by IAB donor 810 or IAB donor 810A, and may be configured to IAB node 820 and UE 830. For instance, IAB donor 810 may determine DRB association #1 and may transmit the determined DRB association #1 to UE 830, IAB node 820 and IAB donor 810A. IAB donor 810 (or IAB donor 810A) may determine DRB association #2 and may transmit the determined DRB association #2 to UE 830, IAB node 820 and IAB donor 810A (or IAB donor 810). In some examples, IAB donor 810 (or IAB donor 810A) may transmit or configure the determined DRB association #1 and the determined DRB association #2 to IAB node 820 or UE 830 in a single signaling.

Since UE 830 is configured with DRB association #1 and DRB association #2 by at least one of IAB node 820, IAB donor 810, and IAB donor 810A, UE 830 can determine the source of the DL packet based on the DRB where the DL packet is received and at least one of the configured associations.

For example, in the case that the DRB where the DL packet is received is from DRB association #1, the source of the DL packet is IAB donor 810. In the case that the DRB where the DL packet is received is from DRB association #2, the source of the DL packet is IAB donor 810A.

Referring back to FIG. 7, in some embodiments of the present disclosure, IAB node 720 may map the DL packet to an LCH or an RLC channel (CH) (which may also be called as "RLC bearer") associated with the source of the DL packet. That is, although the same or different DRBs can be used for DL packets from different IAB donors, packets from different IAB donors or IAB donor-CUs may be mapped to different LCHs or RLC CHs. In this way, IAB node 720 provides the DL packet with the source of the DL packet.

For example, referring to FIG. 8B, UE 830 may be connected to two IAB donors (e.g., IAB donor 810 and IAB donor 810A) via IAB node 820. IAB node 820 may map a DL packet from IAB donor 810 to an LCH (e.g., LCH 1) between IAB node 820 and UE 830, and map a DL packet from IAB donor 810A to another LCH (e.g., LCH 2) between IAB node 820 and UE 830. In some other embodiments of the present disclosure, IAB node 820 may map DL packet from IAB donor 810 to an RLC CH between IAB node 820 and UE 830, and map DL packet from IAB donor 810A to another RLC CH between IAB node 820 and UE 830.

To achieve this, an association (hereinafter, "LCID association #1") between IAB donor 810 and a set of LCIDs and an association (hereinafter, "LCID association #2") between IAB donor 810A and another set of LCIDs need to be determined. An LCH or an RLC CH may be identified by an LCID. For example, in the case that the DL packet is from IAB donor 810, IAB node 820 may map the DL packet to an LCH (or an RLC CH in some other embodiments) corresponding to an LCID from LCID association #1. In the case that the DL packet is from IAB donor 810A, IAB node 820 may map the DL packet to an LCH (or an RLC CH in some other embodiments) corresponding to an LCID from LCID association #2.

Moreover, an association between a DRB from IAB donor 810 or IAB donor 810A and one or more LCIDs between IAB node 820 and UE 830 may be configured to IAB node 820 by at least one of IAB donor 810 and IAB donor 810A or determined by the IAB node 820 itself. The DRB may be identified by a DRB ID, and can be mapped to at least one LCID. In this way, IAB node 820 can split the DL packets from one common DRB of different IAB donors to different LCHs or RLC CHs.

LCID association #1, LCID association #2, or both may be determined by IAB node 820, IAB donor 810, IAB donor 810A, or any combination thereof.

In some examples, LCID association #1, LCID association #2, or both may be determined by IAB node 820. In response to the determination, IAB node 820 may transmit the determined LCID association #1, the determined LCID association #2, or both to at least one of IAB donor 810 and IAB donor 810A. For instance, IAB node 820 may determine LCID association #1, and may transmit the determined LCID association #1 to IAB donor 810, IAB donor 810A, or both. IAB node 820, IAB donor 810 or IAB donor 810A may configure the determined LCID association #1, the determined LCID association #2, or both to UE 830. In some examples, IAB node 820 may transmit or configure the determined LCID association #1 and the determined LCID association #2 in a single signaling.

In some examples, LCID association #1, LCID association #2, or both may be determined by IAB donor 810 or IAB donor 810A, and may be configured to IAB node 820 and UE 830. For instance, IAB donor 810 may determine LCID association #1 and may transmit the determined LCID association #1 to UE 830, IAB node 820 and IAB donor 810A. IAB donor 810 (or IAB donor 810A) may determine LCID association #2 and may transmit the determined LCID association #2 to UE 830, IAB node 820 and IAB donor 810A (or IAB donor 810). In some examples, IAB donor 810 (or IAB donor 810A) may transmit or configure the determined LCID association #1 and the determined LCID association #2 to IAB node 820 or UE 830 in a single signaling.

Since UE 830 is configured with LCID association #1 and LCID association #2 by at least one of IAB node 820, IAB donor 810, and IAB donor 810A, UE 830 can determine the source of the DL packet based on the LCID for the LCH or RLC CH where the DL packet is received and at least one of the configured associations.

For example, in the case that the LCID for the LCH (or the RLC CH in some other embodiments) where the DL packet is received is from LCID association #1, the source of the DL packet is IAB donor 810. In the case that the LCID for the LCH (or the RLC CH in some other embodiments) where the DL packet is received is from LCID association #2, the source of the DL packet is IAB donor 810A.

Figure 9:
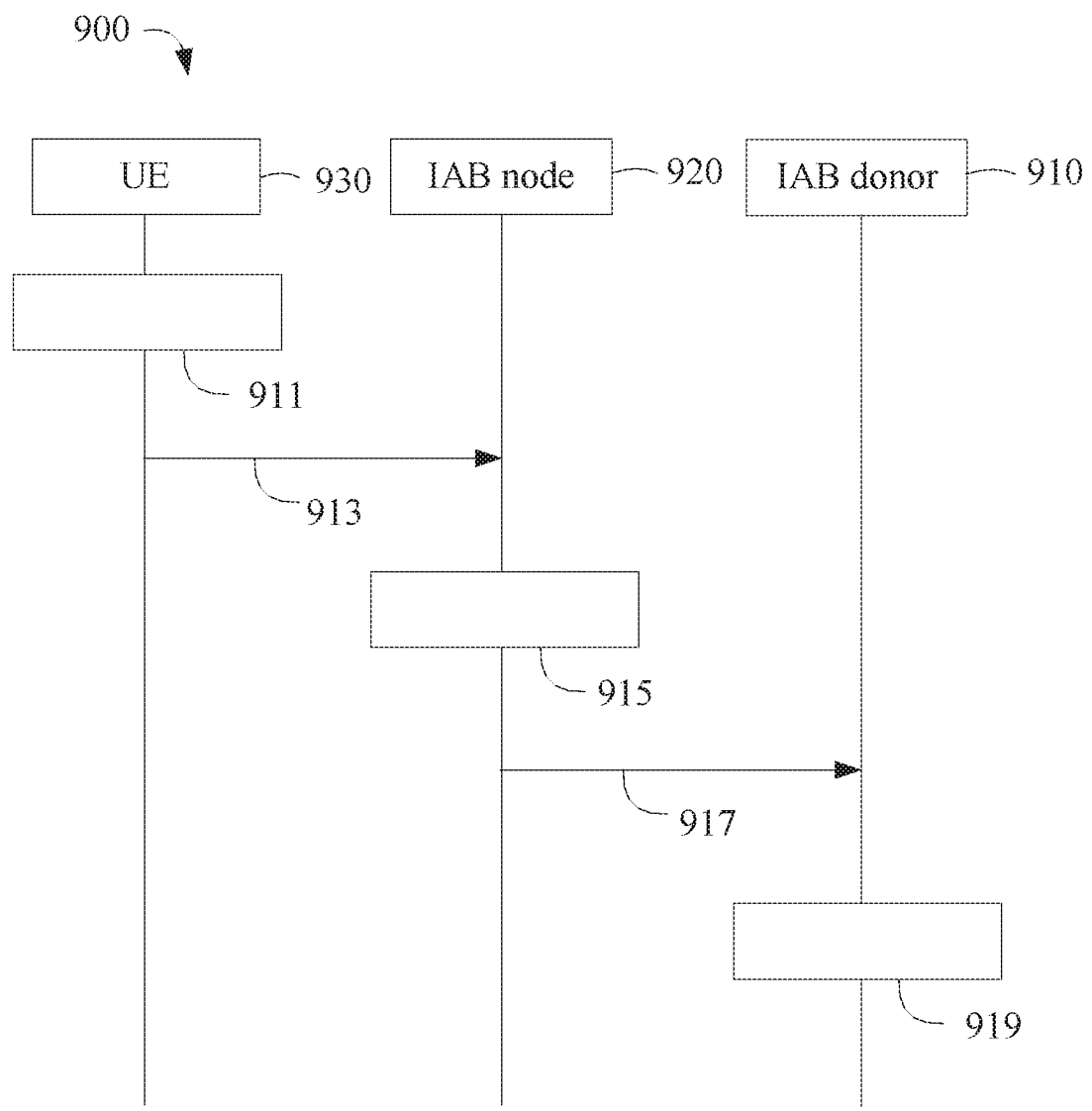
FIG. 9 illustrates a flow chart of an exemplary procedure of wireless communications in accordance with some embodiments of the present disclosure.

FIG. 9 illustrates a flow chart of an exemplary procedure 900 of wireless communications in accordance with some embodiments of the present disclosure.

Details described in all of the foregoing embodiments of the present disclosure are applicable for the embodiments shown in FIG. 9. It should be appreciated by persons skilled in the art that the sequence of the operations in exemplary procedure 900 may be changed and some of the operations in exemplary procedure 900 may be eliminated or modified, without departing from the spirit and scope of the disclosure.

In some examples, UE 930 may function as UE 130A or UE 130B in FIG. 1, or the UEs in FIGS. 2-4 and 6. IAB node 920 may function as IAB node 120A, IAB node 120B or IAB node 120C in FIG. 1, IAB node 1 or IAB node 2 in FIGS. 2 and 3, or the IAB node in FIGS. 5 and 6. The IAB donor 910 may function as IAB donor 110A or IAB donor 110B in FIG. 1, the IAB donor in FIGS. 2 and 3, BS 1 or BS 2 in FIG. 4, or IAB donor 1 or IAB donor 2 in FIG. 6.

The exemplary procedure 900 shows a procedure of an uplink transmission, in which UE 930 is connected to IAB donor 910 and another IAB donor (not shown in FIG. 9) via IAB node 920.

Referring to FIG. 9, in operation 911, UE 930 may cipher a UL packet with a cipher configuration (e.g., ciphering algorithm and key) associated with a destination of the UL packet. The destination of the UL packet may be either IAB donor 910 or the another IAB donor (not shown in FIG. 9).

Various solutions are proposed to facilitate the differentiation of the destination of the UL packet by IAB node 920.

For example, in some embodiments of the present disclosure, IAB node 920 may have more than one logical IAB-DU. Each of the more than one IAB-DU may be associated with a corresponding IAB donor. UE 930 may transmit the UL packet to an IAB donor via a corresponding IAB-DU. IAB node 920 may be configured with an association between the IAB-DUs of the IAB node 920 or IAB donors and BAP routing IDs. In this way, different IAB-DUs can split UL packets to different IAB donors.

Figure 10A:
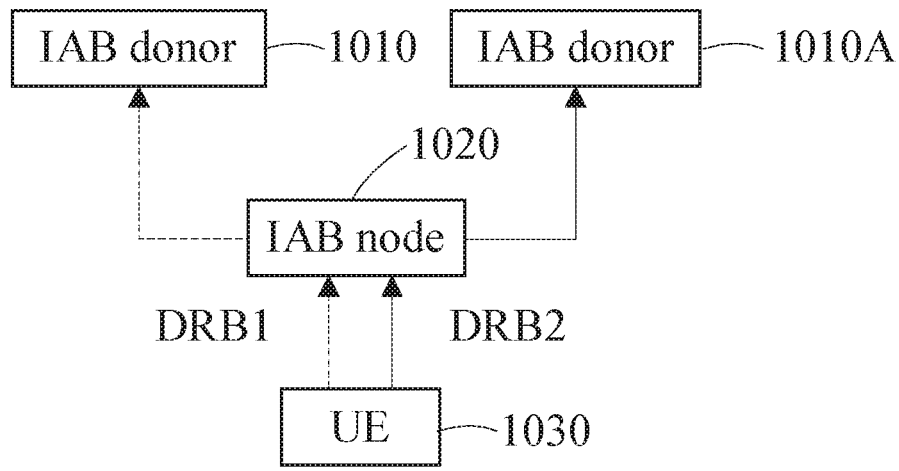
FIGS. 10A-10C illustrate schematic diagrams of wireless communication systems in accordance with some embodiments of the present disclosure.
Figure 10B:
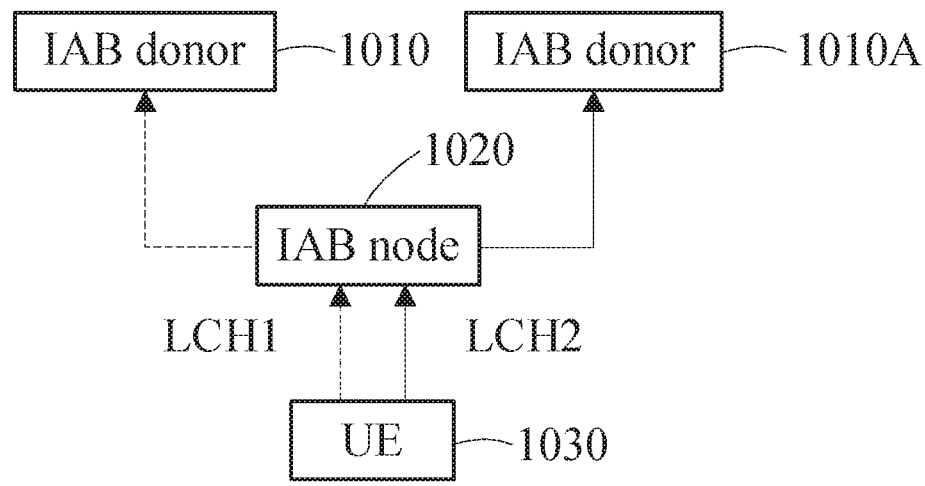
Figure 10C:
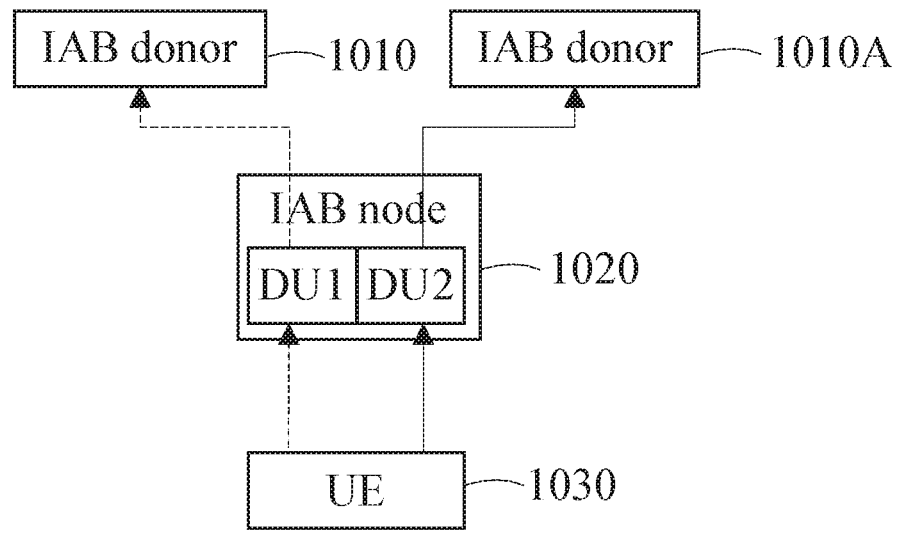

For example, referring to FIG. 10C, UE 1030 may be connected to two IAB donors (e.g., IAB donor 1010 and IAB donor 1010A) via IAB node 1020. IAB node 1020 may include two DUs, DU 1 and DU 2, wherein DU 1 is associated with IAB donor 1010 and DU 2 is associated with IAB donor 1010A. For example, separate F1 interfaces may be established between the two DUs and the respective IAB donors. In this way, IAB node 1020 would know the relationship between the DUs of IAB node 1020 and IAB donors 1010 and 1010A.

For example, UE 1030 may transmit a UL packet to IAB donor 1010 via DU 1. IAB node 1020 may receive the UL packet at a cell, which is configured in DU 1 of IAB node 1020 associated with IAB donor 1010. IAB node 1020 can determine the destination of the UL packet based on an identifier (e.g., cell global identifier (CGI)) of the cell, or any other identifiers which can identify DU 1 of IAB node 1020. In response to receiving the UL packet at the cell configured in DU 1, IAB node 1020 may route the UL packets to IAB donor 1010. IAB donor 1010 may decipher the UL packet using the corresponding deciphering configuration (e.g., deciphering algorithm and key).

Similarly, UE 1030 may transmit a UL packet to IAB donor 1010A via DU 2. IAB node 1020 may receive the UL packet at a cell, which is configured in DU 2 of IAB node 1020 associated with IAB donor 1010A. IAB node 1020 can determine the destination of the UL packet based on an identifier (e.g., cell global identifier (CGI)) of the cell, or any other identifiers which can identify DU 2 of IAB node 1020. In response to receiving the UL packet at the cell configured in DU 2, IAB node 1020 may route the UL packets to IAB donor 1010A. IAB donor 1010A may decipher the UL packet using the corresponding deciphering configuration (e.g., deciphering algorithm and key).

Referring back to FIG. 9, in some other embodiments of the present disclosure, UE 930 may provide the ciphered UL packet with the destination of the UL packet. In operation 913, UE 930 may transmit the ciphered packet to IAB node 920 for transmitting to the destination of the UL packet. In the exemplary procedure 900, it is assumed that the destination of the UL packet is IAB donor 910, so the ciphered packet is transmitted to IAB donor 910 via IAB node 920 in operation 917.

In some embodiments of the present disclosure, UE 930 may add an indication of whether the destination of the UL packet is IAB donor 910 or the another IAB donor (not shown in FIG. 9) to the ciphered UL packet. In this way, UE 930 provides the ciphered UL packet with the destination of the UL packet. Based on the indication in the UL packet, IAB node 920 can determine the destination of the UL packet in operation 915.

In some examples, the indication may be an identifier of IAB donor 910 or the another IAB donor, an identifier of a CU of IAB donor 910 or the another IAB donor, or an identifier of a CP of the CU of IAB donor 910 or the another IAB donor. In some examples, the indication may include at least one bit (e.g., 1 bit) to indicate IAB donor 910 or the another IAB donor. For instance, the value of the bit being "0" may indicate the destination of the UL packet is IAB donor 910 and the value of the bit being "1" may indicate the destination of the UL packet is the another IAB donor (not shown in FIG. 9); or vice versa. In some examples, the indication may be added to an RLC header or a MAC sub-header for the UL packet.

In operation 917, IAB node 920 can transmit the UL packet to the destination of the UL packet. For example, IAB node 920 may route the UL packet to a DU of IAB donor 910 using the routing configuration. The DU of IAB donor 910 may deliver the UL packets to a CU of IAB donor 910 through a wired or wireless link. In operation 919, in response to receiving the UL packet, IAB donor 910 or the CU of IAB donor 910 may decipher the UL packet using the corresponding deciphering configuration (e.g., deciphering algorithm and key).

In some embodiments of the present disclosure, UE 930 may map the ciphered UL packet to a DRB associated with the destination of the UL packet. That is, packets to different IAB donors or IAB donor-CUs may be mapped to different DRBs. In this way, UE 930 provides the UL packet with the destination of the UL packet.

For example, referring to FIG. 10A, UE 1030 may be connected to two IAB donors (e.g., IAB donor 1010 and IAB donor 1010A) via IAB node 1020. UE 1030 may map UL packet to IAB donor 1010 to a DRB (e.g., DRB 1) between IAB node 1020 and UE 1030, and map UL packet to IAB donor 1010A to another DRB (e.g., DRB 2) between IAB node 1020 and UE 1030.

In some embodiments of the present disclosure, to achieve this, an association (hereinafter, "DRB association #1A") between IAB donor 1010 and a set of DRBs or DRB IDs and an association (hereinafter, "DRB association #2A") between IAB donor 1010A and another set of DRBs or DRB IDs need to be determined. DRB association #1A, DRB association #2A, or both may be determined by IAB node 1020, IAB donor 1010, IAB donor 1010A, or any combination thereof.

In some examples, DRB association #1A, DRB association #2A, or both may be determined by IAB node 1020. In response to the determination, IAB node 1020 may transmit the determined DRB association #1A, the determined DRB association #2A, or both to at least one of IAB donor 1010 and IAB donor 1010A. For instance, IAB node 1020 may determine DRB association #1A, and may transmit the determined DRB association #1A to IAB donor 1010, IAB donor 1010A, or both. IAB node 1020, IAB donor 1010 or IAB donor 1010A may configure the determined DRB association #1A, the determined DRB association #2A, or both to UE 1030. In some examples, IAB node 1020 may transmit or configure the determined DRB association #1A and the determined DRB association #2A in a single signaling.

In the case that the UL packet is to IAB donor 1010, UE 1030 may map the UL packet to a DRB based on DRB association #1A. In the case that the UL packet is to IAB donor 1010A, UE 1030 may map the UL packet to a DRB based on DRB association #2A.

IAB node 1020 can determine the destination of the UL packet from UE 1030 based on the DRB where the UL packet is received and at least one of DRB association #1A and DRB association #2A. In the case that the DRB where the UL packet is received is from the set of DRBs indicated by DRB association #1A, the destination of the UL packet is the IAB donor 1010. In the case that the DRB where the UL packet is received is from the set of DRB indicated by DRB association #2A, the destination of the UL packet is IAB donor 1010A.

Moreover, at least one of IAB donor 1010 and IAB donor 1010A may configure IAB node 1020 with an association between BAP routing IDs associated with IAB donor 1010 or IAB donor 1010A and DRBs between IAB node 1020 and UE 1030. IAB node 1020 can route the UL packet to the corresponding IAB donor according to the routing configuration.

In some other examples, DRB association #1A, DRB association #2A, or both may be determined by IAB donor 1010 or IAB donor 1010A. DRB association #1A and DRB association #2A may be configured to UE 1030 by either IAB donor 1010 or IAB donor 1010A via different or a single signaling.

In some embodiments of the present disclosure, IAB node 1020 may also be configured with DRB association #1A and DRB association #2A by either IAB donor 1010 or IAB donor 1010A. In these embodiments, since the detailed BAP routing IDs are not configured, IAB node 1020 can select any available egress BAP routing ID on the corresponding BH link pointing to the destination IAB donor.

In some embodiments of the present disclosure, IAB node 1020 may be configured with a mapping between a set of BAP routing IDs (hereinafter, "BAP routing ID set #1") associated with IAB donor 1010 and a set of DRBs (hereinafter, "DRB set #1") between IAB node 1020 and UE 1030, and another mapping between another set of BAP routing IDs (hereinafter, "BAP routing ID set #2") associated with IAB donor 1010A and another set of DRBs (hereinafter, "DRB set #2") between IAB node 1020 and UE 1030. The BAP routing ID may include the destination BAP address and a path ID. The two mappings may be configured in different or a single signaling.

In response to receiving a UL packet from a specific DRB, IAB node 1020 may deliver it to a corresponding backhaul (BH) link, which points to the destination IAB donor, based on the configured mappings. For example, in the case that the DRB where the UL packet is received is from DRB set #1, IAB node 1020 may transmit the UL packet according to a BAP routing ID in BAP routing ID set #1. In the case that the DRB where the UL packet is received is from DRB set #2, IAB node 1020 may transmit the UL packet according to a BAP routing ID in BAP routing ID set #2.

In some embodiments of the present disclosure, IAB node 1020 may be configured with a mapping between a parent node (hereinafter, "parent node #1") of IAB node 1020 and a set of DRBs (hereinafter, "DRB set #1A") between IAB node 1020 and UE 1030, another mapping between another parent node (hereinafter, "parent node #2") of IAB node 1020 and another set of DRBs (hereinafter, "DRB set #2A"). The two mappings may be configured in different or a single signaling. The parent node of IAB node 1020 may be an IAB donor or an IAB node.

For example, in the case that the DRB where the UL packet is received is from DRB set #1A, IAB node 1020 may transmit the UL packet to parent node #1. In the case that the DRB where the UL packet is received is from DRB set #2A, IAB node 1020 may transmit the UL packet to parent node #2. In these embodiments, since the detailed BAP routing IDs are not configured, IAB node 1020 can select any available egress BAP routing ID on the corresponding BH link pointing to the destination IAB donor.

Referring back to FIG. 9, in some embodiments of the present disclosure, UE 930 may map the UL packet to an LCH or an RLC CH associated with the destination of the UL packet. In this way, UE 930 provides the UL packet with the destination of the UL packet.

For example, referring to FIG. 10B, UE 1030 may be connected to two IAB donors (e.g., IAB donor 1010 and IAB donor 1010A) via IAB node 1020. UE 1030 may map UL packet to IAB donor 1010 to an LCH (e.g., LCH 1) between IAB node 1020 and UE 1030 and map UL packet to IAB donor 1010A to another LCH (e.g., LCH 2) between IAB node 1020 and UE 1030. In some other embodiments of the present disclosure, UE 1030 may map UL packet to IAB donor 1010 to an RLC CH between IAB node 1020 and UE 1030, and map UL packet to IAB donor 1010A to another RLC CH between IAB node 1020 and UE 1030.

In some embodiments of the present disclosure, to achieve this, an association (hereinafter, "LCID association #1A") between IAB donor 1010 and a set of LCIDs and an association (hereinafter, "LCID association #2A") between IAB donor 1010A and another set of LCIDs need to be determined. An LCH or an RLC CH may be identified by an LCID. LCID association #1A, LCID association #2A, or both may be determined by IAB node 1020, IAB donor 1010, IAB donor 1010A, or any combination thereof.

In some examples, LCID association #1A, LCID association #2A, or both may be determined by IAB node 1020. In response to the determination, IAB node 1020 may transmit the determined LCID association #1A, the determined LCID association #2A, or both to at least one of IAB donor 1010 and IAB donor 1010A. For instance, IAB node 1020 may determine LCID association #1A, and may transmit the determined LCID association #1A to IAB donor 1010, IAB donor 1010A, or both. IAB node 1020, IAB donor 1010 or IAB donor 1010A may configure the determined LCID association #1A, the determined LCID association #2A, or both to UE 1030. In some examples, IAB node 1020 may transmit or configure the determined LCID association #1A and the determined LCID association #2A in a single signaling.

In the case that the UL packet is to IAB donor 1010, UE 1030 may map the UL packet to an LCH (or an RLC channel in some other embodiments) corresponding to an LCID based on LCID association #1A. In the case that the UL packet is to IAB donor 1010A, UE 1030 may map the UL packet to an LCH (or an RLC channel in some other embodiments) corresponding to an LCID based on LCID association #2A.

IAB node 1020 can determine the destination of the UL packet from UE 1030 based on the LCH or RLC CH where the UL packet is received and at least one of LCID association #1A and LCID association #2A. In the case that the LCID for the LCH (or the RLC CH in some other embodiments) where the UL packet is received is from the set of LCIDs indicated by LCID association #1A, the destination of the UL packet is IAB donor 1010. In the case that the LCID for the LCH (or the RLC CH in some other embodiments) where the UL packet is received is from the set of LCIDs indicated by LCID association #2A, the destination of the UL packet is IAB donor 1010A.

In some other examples, LCID association #1A, LCID association #2A, or both may be determined by IAB donor 1010 or IAB donor 1010A. LCID association #1A and LCID association #2A may be configured to UE 1030 by either IAB donor 1010 or IAB donor 1010A via different or a single signaling.

In some embodiments of the present disclosure, IAB node 1020 may also be configured with LCID association #1A and LCID association #2A by either IAB donor 1010 or IAB donor 1010A. In these embodiments, since the detailed BAP routing IDs are not configured, IAB node 1020 can select any available egress BAP routing ID on the corresponding BH link pointing to the destination IAB donor.

In some embodiments of the present disclosure, IAB node 1020 may be configured with a mapping between a set of BAP routing IDs (hereinafter, "BAP routing ID set #1A") associated with IAB donor 1010 and a set of LCIDs (hereinafter, "LCID set #1") between IAB node 1020 and UE 1030, and another mapping between another set of BAP routing IDs (hereinafter, "BAP routing ID set #2A") associated with IAB donor 1010A and another set of LCIDs (hereinafter, "LCID set #2"). The two mappings may be configured in different or a single signaling.

In response to receiving a UL packet from a specific LCH or RLC CH, IAB node 1020 may deliver it to a corresponding BH link, which points to the destination IAB donor, based on the configured mappings. For example, in the case that the LCID for the LCH or RLC CH where the UL packet is received is from LCID set #1, IAB node 1020 may transmit the UL packet according a BAP routing ID in BAP routing ID set #1A. In the case that the LCID for the LCH or RLC CH where the UL packet is received is from LCID set #2, IAB node 1020 may transmit the UL packet according a BAP routing ID in BAP routing ID set #2A.

In some embodiments of the present disclosure, IAB node 1020 may be configured with a mapping between a parent node (hereinafter, "parent node #1A") of IAB node 1020 and a set of LCIDs (hereinafter, "LCID set #1A"), and another mapping between another parent node (hereinafter, "parent node #2A") of IAB node 1020 and another set of LCIDs (hereinafter, "LCID set #2A"). The two mappings may be configured in different or a single signaling. The parent node of IAB node 1020 may be an IAB donor or an IAB node.

For example, in the case that the LCID for the LCH or RLC CH where the UL packet is received is from LCID set #1A, IAB node 1020 may transmit the UL packet to parent node #1A. In the case that the LCID for the LCH or RLC CH where the UL packet is received is from LCID set #2A, IAB node 1020 may transmit the UL packet to parent node #2A. In these embodiments, since the detailed BAP routing IDs are not configured, IAB node 1020 can select any available egress BAP routing ID on the corresponding BH link pointing to the destination IAB donor.

Moreover, although separate LCHs or RLC CHs may be used for UL packets to different IAB-donors, the same DRB may be used for UL packets to different IAB-donors. For example, at least one of IAB donor 1010 and IAB donor 1010A may configure IAB node 1020 with an association between a DRB from at least one of the IAB donor 1010 and IAB donor 1010A and one or more LCIDs for LCHs or RLC CHs between IAB node 1020 and UE 1030. The DRB may be identified by a DRB ID, and can be mapped to at least one LCID. Therefore, IAB node 1020 can use the same DRB to transmit the UL packets to different IAB donors.

Figure 11:
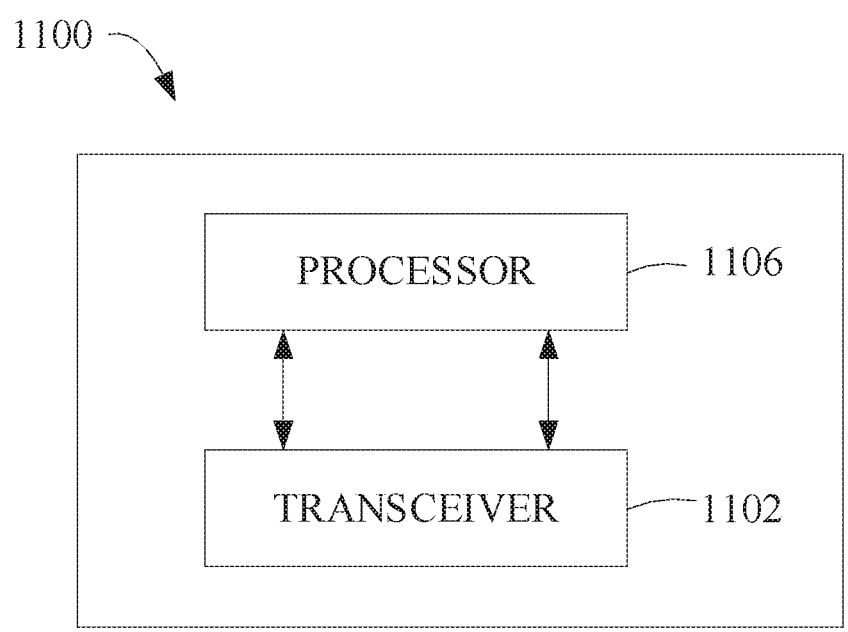
FIG. 11 illustrates a block diagram of an exemplary apparatus in accordance with some embodiments of the present disclosure.

FIG. 11 illustrates a block diagram of an exemplary apparatus 1100 according to some embodiments of the present disclosure.

As shown in FIG. 11, the apparatus 1100 may include at least one processor 1106 and at least one transceiver 1102 coupled to the processor 1106. The apparatus 1100 may be an IAB donor, an IAB node or a UE.

Although in this figure, elements such as the at least one transceiver 1102 and processor 1106 are described in the singular, the plural is contemplated unless a limitation to the singular is explicitly stated. In some embodiments of the present application, the transceiver 1102 may be divided into two devices, such as a receiving circuitry and a transmitting circuitry. In some embodiments of the present application, the apparatus 1100 may further include an input device, a memory, and/or other components.

In some embodiments of the present application, the apparatus 1100 may be a UE. The processor 1106 may be configured to cipher a UL packet with a cipher configuration associated with a destination of the UL packet, wherein the UE is connected to a first IAB donor and a second IAB donor via an IAB node, and the destination of the UL packet is either the first IAB donor or the second IAB donor. The processor 1106 may be further configured to provide the ciphered UL packet with the destination of the UL packet. The transceiver 1102 may be configured to transmit the ciphered UL packet to the destination of the UL packet via the IAB node.

In some embodiments of the present application, the apparatus 1100 may be an IAB node. The transceiver 1102 may be configured to receive a UL packet from a UE, wherein the UE is connected to a first IAB donor and a second IAB donor via the IAB node. The processor 1106 may be configured to determine a destination of the UL packet from the received UL packet, wherein the destination of the UL packet is either the first IAB donor or the second IAB donor. The transceiver 1102 may be further configured to transmit the UL packet to the destination of the UL packet.

In some embodiments of the present application, the apparatus 1100 may be a UE. The transceiver 1102 may be configured to receive a DL packet from an IAB node, wherein the UE is connected to a first IAB donor and a second IAB donor via the IAB node. The processor 1106 may be configured to determine a source of the DL packet based on the received DL packet, wherein the source of the DL packet is either the first IAB donor or the second IAB donor. The processor 1106 may be further configured to decipher the DL packet with a decipher configuration associated with the source of the DL packet.

In some embodiments of the present application, the apparatus 1100 may be an IAB node. The transceiver 1102 may be configured to receive a DL packet to a UE, and wherein the UE is connected to a first integrated access and backhaul (IAB) donor and a second IAB donor via the IAB node. The processor 1106 may be configured to determine a source of the DL packet, wherein the source of the DL packet is either the first IAB donor or the second IAB donor. The processor 1106 may be further configured to provide the DL packet with the source of the DL packet. The transceiver 1102 may be further configured to transmit the DL packet with the source of the DL packet to the UE.

In some embodiments of the present application, the apparatus 1100 may be an IAB donor. In some examples, the processor 1106 may be configured to construct a first association between the IAB donor and a first set of DRBs or LCIDs of a UE. The UE is connected to the IAB donor and another IAB donor via an IAB node. The transceiver 1102 may be configured to transmit, to at least one of the UE, the IAB node and the another IAB donor, the constructed first association.

In some embodiments, constructing the first association may include determine the first association at the IAB donor. In some embodiments, constructing the first association may include receiving the first association from another communication node, for example, the another IAB donor or the IAB node.

In some embodiments of the present application, the apparatus 1100 may further include at least one non-transitory computer-readable medium. In some embodiments of the present disclosure, the non-transitory computer-readable medium may have stored thereon computer-executable instructions to cause a processor to implement the method with respect to the UEs as described above. For example, the computer-executable instructions, when executed, cause the processor 1106 interacting with transceiver 1102, so as to perform the operations with respect to the UEs described in FIGS. 1-10C.

In some embodiments of the present disclosure, the non-transitory computer-readable medium may have stored thereon computer-executable instructions to cause a processor to implement the method with respect to the IAB node as described above. For example, the computer-executable instructions, when executed, cause the processor 1106 interacting with transceiver 1102, so as to perform the operations with respect to the IAB nodes described in FIGS. 1-10C.

In some embodiments of the present disclosure, the non-transitory computer-readable medium may have stored thereon computer-executable instructions to cause a processor to implement the method with respect to the IAB donor as described above. For example, the computer-executable instructions, when executed, cause the processor 1106 interacting with transceiver 1102, so as to perform the operations with respect to the IAB donor described in FIGS. 1-10C.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." Expressions such as "A and/or B" or "at least one of A and B" may include any and all combinations of words enumerated along with the expression. For instance, the expression "A and/or B" or "at least one of A and B" may include A, B, or both A and B. The wording "the first," "the second" or the like is only used to clearly illustrate the embodiments of the present application, but is not used to limit the substance of the present application.

What is claimed is:

1. A user equipment (UE) for wireless communication, comprising:
   at least one memory; and
   at least one processor coupled with the at least one memory and configured to cause the UE to:
      cipher an uplink (UL) packet with a cipher configuration associated with a destination of the UL packet, wherein the UE is connected to a first integrated access and backhaul (IAB) donor and a second IAB donor via an IAB node, and the destination of the UL packet is either at least one of the first IAB donor or the second IAB donor;
      provide the ciphered UL packet with the destination of the UL packet; and
      transmit the ciphered UL packet to the destination of the UL packet via the IAB node.

2. The UE of claim 1, wherein to provide the ciphered UL packet with the destination of the UL, the at least one processor is configured to cause the UE to:
   add an indication of whether the destination of the UL packet is the first IAB donor or the second IAB donor to the ciphered UL packet.

3. The UE of claim 2, wherein the at least one processor is configured to cause the UE to add the indication to one or more of a radio link control (RLC) header or a medium access control (MAC) sub-header for the ciphered UL packet.

4. The UE of claim 2, wherein at least one of:
   the indication comprises one or more of an identifier of the first IAB donor, an identifier of the second IAB donor, an identifier of a centralized unit (CU) of the first IAB donor, an identifier of a CU of the second IAB donor, an identifier of a control plane (CP) of the CU of the first IAB donor, or an identifier of a CP of the CU of the second IAB donor; or
   the indication includes at least one bit to indicate the first IAB donor or the second IAB donor.

5. The UE of claim 1, wherein to provide the ciphered UL packet with the destination of the UL packet, the at least one processor is configured to cause the UE to:
   map the ciphered UL packet to a data radio bearer (DRB) associated with the destination of the UL packet.

6. The UE of claim 5, wherein the at least one processor is configured to cause the UE to one or more of:

receive one or more of a first association between the first IAB donor and a first set of DRB or a second association between the second IAB donor and a second set of DRB from the first IAB donor; or receive the one or more of the first association or the second association from the second IAB donor.

7. The UE of claim 1, wherein to provide the ciphered UL packet with the destination of the UL packet, the at least one processor is configured to cause the UE to:

map the ciphered UL packet to one or more of a logical channel (LCH) or a radio link control (RLC) channel associated with the destination of the UL packet.

8. The UE of claim 7, further wherein the at least one processor is configured to cause the UE to one or more of:

receive one or more of a first association between the first IAB donor and a first set of logical channel IDs (LCID) or a second association between the second IAB donor and a second set of LCID from the first IAB donor; or receive the one or more of the first association or the second association from the second IAB donor.

9. An integrated access and backhaul (IAB) node, comprising:

at least one memory; and at least one processor coupled with the at least one memory and configured to cause the IAB node to:

receive a downlink (DL) packet for transmission to a user equipment (UE), wherein the UE is connected to a first integrated access and backhaul (IAB) donor and a second IAB donor via the IAB node;

determine a source of the DL packet, wherein the source of the DL packet is at least one of the first IAB donor or the second IAB donor;

provide the DL packet with the source of the DL packet; and transmit the DL packet to the UE.

10. The IAB node of claim 9, to provide the DL packet with the source of the DL packet, the at least one processor is configured to cause the IAB node to:

add an indication of whether the source of the DL packet is the first IAB donor or the second IAB donor to the DL packet.

11. The IAB node of claim 10, wherein the at least one processor is configured to cause the IAB node to add the indication to one or more of a radio link control (RLC) header or a medium access control (MAC) sub-header for the DL packet.

12. The IAB node of claim 10, wherein one or more of:

the indication comprises one or more of an identifier of the first IAB donor, an identifier of the second IAB donor, an identifier of a centralized unit (CU) of the first IAB donor, and identifier of a CU of the second IAB donor, an identifier of a control plane (CP) of the CU of the first IAB donor, or an identifier of a CP of the second IAB donor; or the indication includes at least one bit to indicate one or more of the first IAB donor or the second IAB donor.

13. The IAB node of claim 9, wherein to provide the DL packet with the source of the DL packet, the at least one processor is configured to cause the IAB node to one or more of:

map the DL packet to a data radio bearer (DRB) associated with the source of the DL packet; or map the DL packet to a logical channel (LCH) or a radio link control (RLC) channel associated with the source of the DL packet.

14. The IAB node of claim 13, wherein the at least one processor is configured to cause the LAB node to one or more of:

determine one or more of a first association between the first IAB donor and a first set of data radio bearers DRB, a second association between the second IAB donor and a second set of DRB, and transmit the one or more of the first association or the second association to at least one of the first IAB donor or the second IAB donor;

receive the one or more of the first association between the first IAB donor and the first set of DRB or the second association between the second IAB donor and the second set of DRB from the first IAB donor;

receive the one or more of the first association between the first IAB donor and the first set of DRB or the second association between the second IAB donor and the second set of DRB from the second IAB donor;

determine one or more of a first association between the first IAB donor and a first set of logical channel IDs (LCID) or a second association between the second IAB donor and a second set of LCID, and transmit the one or more of the first association between the first IAB donor and the first set of LCID or the second association between the second IAB donor and the second set of LCID to at least one of the first IAB donor or the second IAB donor;

receiving the one or more of the first association between the first IAB donor and the first set of LCID or the second association between the second IAB donor and the second set of LCID from the first IAB donor; or receiving the one or more of the first association between the first IAB donor and the first set of LCID or the second association between the second IAB donor and the second set of LCID from the second IAB donor.

15. The IAB node of claim 13, wherein the at least one processor is configured to cause the IAB node to:

receive, from at least one of the first IAB donor or the second IAB donor, an association between a data radio bearer (DRB) from at least one of the first IAB donor or one or more logical channel IDs (LCID).

16. A processor for wireless communication, comprising:

at least one controller coupled with at least one memory and configured to cause the processor to:

cipher, for a user equipment (UE), an uplink (UL) packet with a cipher configuration associated with a destination of the UL packet, wherein the UE is connected to a first integrated access and backhaul (IAB) donor and a second IAB donor via an IAB node, and the destination of the UL packet is at least one of the first IAB donor or the second IAB donor;

provide the ciphered UL packet with the destination of the UL packet; and transmit the ciphered UL packet to the destination of the UL packet via the IAB node.

17. The processor of claim 16, wherein to provide the ciphered UL packet with the destination of the UL, the at least one controller is configured to cause the processor to:

add an indication of whether the destination of the UL packet is the first IAB donor or the second IAB donor to the ciphered UL packet.

18. The processor of claim 17, wherein the at least one controller is configured to cause the processor to add the indication to one or more of a radio link control (RLC) header or a medium access control (MAC) sub-header for the ciphered UL packet.

19. The processor of claim 17, wherein at least one of:

the indication comprises one or more of an identifier of the first IAB donor, an identifier of the second IAB donor, an identifier of a centralized unit (CU) of the first IAB donor, an identifier of a CU of the second IAB donor, an identifier of a control plane (CP) of the CU of the first IAB donor, or an identifier of a CP of the CU of the second IAB donor; or the indication includes at least one bit to indicate the first IAB donor or the second IAB donor.

20. A method performed by a user equipment (UE), the method comprising:

ciphering an uplink (UL) packet with a cipher configuration associated with a destination of the UL packet, wherein the UE is connected to a first integrated access and backhaul (IAB) donor and a second IAB donor via an IAB node, and the destination of the UL packet is at least one of the first IAB donor or the second IAB donor;

providing the ciphered UL packet with the destination of the UL packet; and transmitting the ciphered UL packet to the destination of the UL packet via the IAB node.

* * * * *